US010316712B2

(12) United States Patent
Douglass et al.

(10) Patent No.: US 10,316,712 B2
(45) Date of Patent: Jun. 11, 2019

(54) LUBRICANT COMPOSITIONS FOR SURFACE FINISHING OF MATERIALS

(71) Applicant: ExxonMobil Research and Engineering Company, Annandale, NJ (US)

(72) Inventors: Michael R. Douglass, Cherry Hill, NJ (US); David J. Baillargeon, Cherry Hill, NJ (US); Smruti A. Dance, Robbinsville, NJ (US)

(73) Assignee: EXXONMOBIL RESEARCH AND ENGINEERING COMPANY, Annandale, NJ (US)

(*) Notice: Subject to any disclaimer, the term of this patent is extended or adjusted under 35 U.S.C. 154(b) by 249 days.

(21) Appl. No.: 15/373,050

(22) Filed: Dec. 8, 2016

(65) Prior Publication Data

US 2017/0175600 A1    Jun. 22, 2017

Related U.S. Application Data

(60) Provisional application No. 62/269,493, filed on Dec. 18, 2015.

(51) Int. Cl.
| | | |
|---|---|---|
| *C10M 169/04* | (2006.01) |
| *F01M 7/00* | (2006.01) |
| *C10M 137/10* | (2006.01) |
| *C10M 137/04* | (2006.01) |
| *B33Y 40/00* | (2015.01) |
| *F01M 9/12* | (2006.01) |
| *B22F 3/24* | (2006.01) |
| *C10M 141/12* | (2006.01) |
| *C10M 145/22* | (2006.01) |
| *C10M 129/76* | (2006.01) |
| *C10M 129/26* | (2006.01) |
| *C10M 129/54* | (2006.01) |
| *C10M 133/16* | (2006.01) |
| *B22F 3/105* | (2006.01) |
| *B29C 71/00* | (2006.01) |

(52) U.S. Cl.
CPC ............... *F01M 7/00* (2013.01); *B22F 3/24* (2013.01); *B33Y 40/00* (2014.12); *C10M 129/26* (2013.01); *C10M 129/54* (2013.01); *C10M 129/76* (2013.01); *C10M 133/16* (2013.01); *C10M 137/04* (2013.01); *C10M 137/10* (2013.01); *C10M 137/105* (2013.01); *C10M 141/12* (2013.01); *C10M 145/22* (2013.01); *F01M 9/12* (2013.01); *B22F 3/1055* (2013.01); *B22F 2003/241* (2013.01); *B22F 2003/247* (2013.01); *B29C 71/0009* (2013.01); *C10M 2203/1025* (2013.01); *C10M 2205/0285* (2013.01); *C10M 2207/10* (2013.01); *C10M 2207/144* (2013.01); *C10M 2207/289* (2013.01); *C10M 2209/102* (2013.01); *C10M 2209/103* (2013.01); *C10M 2215/08* (2013.01); *C10M 2223/041* (2013.01); *C10M 2223/045* (2013.01); *C10M 2223/047* (2013.01); *C10N 2210/06* (2013.01); *C10N 2230/06* (2013.01); *C10N 2240/06* (2013.01); *C10N 2240/401* (2013.01); *C10N 2240/406* (2013.01); *C10N 2280/00* (2013.01); *Y02P 10/295* (2015.11)

(58) Field of Classification Search
CPC ......... F01M 7/00; F01M 9/12; C10M 129/26; C10M 129/54; C10M 133/16; C10M 129/76; C10M 141/12; C10M 145/22; C10M 137/04; C10M 137/105; C10M 137/10; C10M 2215/08; C10M 2209/103; C10M 2207/10; C10M 2205/0285; C10M 2203/1025; C10M 2207/144; C10M 2209/102; C10M 2207/289; C10M 2223/041; C10M 2223/045; C10M 2223/047; B33Y 40/00; Y02P 10/295; C10N 2210/06; C10N 2240/06; C10N 2280/00; C10N 2240/406; C10N 2240/401; C10N 2230/06; B22F 3/24; B22F 3/1055; B22F 2003/241; B22F 2003/247; B29C 71/0009

See application file for complete search history.

(56) References Cited

U.S. PATENT DOCUMENTS

| | | |
|---|---|---|
| 1,815,022 A | 7/1931 | Davis |
| 2,015,748 A | 10/1935 | Frolich |

(Continued)

FOREIGN PATENT DOCUMENTS

| | | |
|---|---|---|
| CA | 1094044 A | 1/1981 |
| CN | 203994731 | 12/2014 |

(Continued)

OTHER PUBLICATIONS

GPI Prototype & Manufacturing Services, Inc., Website featuring ways of achieving lower surface roughness of different 3D printed materials: www.gpiprototype.com.

(Continued)

*Primary Examiner* — Jun S Yoo
(74) *Attorney, Agent, or Firm* — Robert A. Migliorini

(57) ABSTRACT

Described herein are lubricant compositions that include combinations of lubricant additives that are effective at improving the surface finish of a range of manufactured materials and equipment. In particular, friction modifiers and antiwear additives are employed to decrease surface roughness of additive manufactured (AM), e.g., 3D printed, materials and equipment in concert with maximizing energy efficiency.

33 Claims, No Drawings

(56) References Cited

U.S. PATENT DOCUMENTS

| | | |
|---|---|---|
| 2,179,125 A | 11/1939 | Kirlin |
| 2,191,498 A | 2/1940 | Reiff |
| 2,387,501 A | 10/1945 | Dietrich |
| 2,443,264 A | 6/1947 | Mikeska |
| 2,471,115 A | 5/1949 | Mikeska |
| 2,526,497 A | 10/1950 | Mikeska |
| 2,591,577 A | 4/1952 | McDermott |
| 2,655,479 A | 10/1953 | Munday et al. |
| 2,666,746 A | 1/1954 | Munday et al. |
| 2,719,126 A | 9/1955 | Fields et al. |
| 2,721,877 A | 10/1955 | Popkin et al. |
| 2,721,878 A | 10/1955 | Popkin |
| 3,036,003 A | 5/1962 | Verdol |
| 3,087,932 A | 4/1963 | Little, Jr. |
| 3,087,936 A | 4/1963 | Le Suer |
| 3,172,892 A | 3/1965 | Le Suer et al. |
| 3,200,107 A | 8/1965 | Le Suer |
| 3,215,707 A | 11/1965 | Rense |
| 3,219,666 A | 11/1965 | Norman et al. |
| 3,250,715 A | 5/1966 | Wyman |
| 3,254,025 A | 5/1966 | Le Suer |
| 3,272,746 A | 9/1966 | Le Suer et al. |
| 3,275,554 A | 9/1966 | Wagenaar |
| 3,316,177 A | 4/1967 | Dorer, Jr. |
| 3,322,670 A | 5/1967 | Burt et al. |
| 3,329,658 A | 7/1967 | Fields |
| 3,382,291 A | 5/1968 | Brennan |
| 3,413,347 A | 11/1968 | Worrel |
| 3,438,757 A | 4/1969 | Honnen et al. |
| 3,444,170 A | 5/1969 | Norman et al. |
| 3,449,250 A | 6/1969 | Fields |
| 3,454,555 A | 7/1969 | van der Voon et al. |
| 3,454,607 A | 7/1969 | Le Suer et al. |
| 3,519,565 A | 7/1970 | Coleman |
| 3,541,012 A | 11/1970 | Stuebe |
| 3,565,804 A | 2/1971 | Honnen et al. |
| 3,595,791 A | 7/1971 | Cohen |
| 3,630,904 A | 12/1971 | Musser et al. |
| 3,632,511 A | 1/1972 | Liao |
| 3,652,616 A | 3/1972 | Watson et al. |
| 3,666,730 A | 5/1972 | Coleman |
| 3,687,849 A | 8/1972 | Abbott |
| 3,697,574 A | 10/1972 | Piasek et al. |
| 3,702,300 A | 11/1972 | Coleman |
| 3,703,536 A | 11/1972 | Piasek et al. |
| 3,704,308 A | 11/1972 | Piasek et al. |
| 3,725,277 A | 4/1973 | Worrel |
| 3,725,480 A | 4/1973 | Traise et al. |
| 3,726,882 A | 4/1973 | Traise et al. |
| 3,742,082 A | 6/1973 | Brennan |
| 3,751,365 A | 8/1973 | Piasek et al. |
| 3,755,433 A | 8/1973 | Miller et al. |
| 3,756,953 A | 9/1973 | Piasek et al. |
| 3,769,363 A | 10/1973 | Brennan |
| 3,770,854 A | 11/1973 | Morris et al. |
| 3,787,374 A | 1/1974 | Adams |
| 3,798,165 A | 3/1974 | Piasek et al. |
| 3,803,039 A | 4/1974 | Piasek et al. |
| 3,822,209 A | 7/1974 | Knapp et al. |
| 3,876,720 A | 4/1975 | Heilman et al. |
| 3,948,800 A | 4/1976 | Meinhardt |
| 4,100,082 A | 7/1978 | Clason et al. |
| 4,149,178 A | 4/1979 | Estes |
| 4,218,330 A | 8/1980 | Shubkin |
| 4,234,435 A | 11/1980 | Meinhardt et al. |
| 4,239,930 A | 12/1980 | Allphin et al. |
| 4,367,352 A | 1/1983 | Watts, Jr. et al. |
| 4,413,156 A | 11/1983 | Watts, Jr. et al. |
| 4,426,305 A | 1/1984 | Malec |
| 4,434,408 A | 2/1984 | Baba et al. |
| 4,454,059 A | 6/1984 | Pindar et al. |
| 4,501,678 A | 2/1985 | A |
| 4,658,072 A | 4/1987 | Johnson |
| 4,758,362 A | 7/1988 | Butke |
| 4,767,551 A | 8/1988 | Hunt et al. |
| 4,798,684 A | 1/1989 | Salomon |
| 4,827,064 A | 5/1989 | Wu |
| 4,827,073 A | 5/1989 | Wu |
| 4,889,647 A | 12/1989 | Rowan et al. |
| 4,910,355 A | 3/1990 | Shubkin et al. |
| 4,941,984 A | 7/1990 | Chamberlin, III et al. |
| 4,956,122 A | 9/1990 | Watts et al. |
| 4,978,464 A | 12/1990 | Coyle et al. |
| 5,034,141 A | 7/1991 | Beltzer et al. |
| 5,034,142 A | 7/1991 | Habeeb et al. |
| 5,055,626 A | 10/1991 | Ho et al. |
| 5,068,487 A | 11/1991 | Theriot |
| 5,084,197 A | 1/1992 | Galic et al. |
| 5,602,086 A | 2/1997 | Le et al. |
| 5,693,598 A | 12/1997 | Abraham et al. |
| 5,705,458 A | 1/1998 | Roby et al. |
| 5,824,627 A | 10/1998 | McConnachie et al. |
| 5,837,657 A | 11/1998 | Fang et al. |
| 5,906,968 A | 5/1999 | McConnachie et al. |
| 6,010,987 A | 1/2000 | Stiefel et al. |
| 6,034,039 A | 3/2000 | Gomes et al. |
| 6,110,878 A | 8/2000 | McConnachie et al. |
| 6,143,701 A | 11/2000 | Boffa |
| 6,153,564 A | 11/2000 | Arunasalam et al. |
| 6,232,276 B1 | 5/2001 | Stiefel et al. |
| 6,569,820 B2 | 5/2003 | McConnachie et al. |
| 6,689,725 B1 | 2/2004 | Gao |
| 6,730,638 B2 | 5/2004 | Farng et al. |
| 6,734,150 B2 | 5/2004 | Gao et al. |
| 2006/0035791 A1* | 2/2006 | Donnelly ............. C10M 141/08 508/273 |
| 2015/0048553 A1 | 2/2015 | Dietrich et al. |
| 2015/0144496 A1 | 5/2015 | Morris |
| 2015/0290707 A1* | 10/2015 | Xu ........................ B22D 23/06 264/497 |
| 2017/0066873 A1* | 3/2017 | Gardet ................. C08G 63/199 |

FOREIGN PATENT DOCUMENTS

| | | |
|---|---|---|
| EP | 0168534 A2 | 1/1986 |
| EP | 0471071 B1 | 8/1995 |
| EP | 1040115 B1 | 6/2004 |
| GB | 2491472 A | 12/2012 |
| KR | 2015042664 A | 4/2015 |
| WO | 98/26030 A1 | 6/1998 |
| WO | 99/31113 A1 | 6/1999 |
| WO | 99/47629 A1 | 9/1999 |
| WO | 99/66013 A1 | 12/1999 |
| WO | 2014/012080 A1 | 1/2014 |
| WO | 2015/012992 A2 | 1/2015 |

OTHER PUBLICATIONS

"Break-In Oils and Assembly Lube Needs", 2014, website: http://www.enginebuildermag.com/2014/10/break-in-oils-and-assembly-lube-needs.

Garcia, C.R. et al., "Effects of extreme surface roughness on 3D printed horn antenna", Electronics Letters, 2013, vol. 49, No. 12.

Adebayo, Adeyinka et al., "Effects of solid lubricants on wire and arc additive manufactures structures", Institution of Mechanical Engineers, Proceedings Part B: Journal of Engineering Manufacture, 2014, vol. 228, No. 4, pp. 563-571.

Galeta, T. et al., "Impact of strengthening fluids on roughness of 3D printed models", Metalurgija, 2015, vol. 54, No. 1, pp. 231-234.

Adebayo, A. et al., "Lubricants in deposition and machining of wire and arc additive manufactured structures", Materials Science and Technology Conference and Exhibition, Oct. 2013.

Degarmo, E. Paul et al., "Materials and Processes in Manufacturing", Ninth Edition, Chapter 25.

Eapen, K.C. et al., "Poly-n-Alkylbenzene compounds, a class of thermally stable and wide liquid range fluids", Symposium on Trends in Lube Oil Basestocks, American Chemical Society, Aug. 1984, Philadelphia, PA.

Dressler, Hans, "Alkylated Aromatics", Synthetic Lubricants and High-Performance Functional Fluids, Chapter 5, pp. 125-144.

(56) References Cited

OTHER PUBLICATIONS

Bagehorn S, et al, Einfluss mechanischer and chemischer Nachbehandlungsverfahren auf die Oberflachenmorphologie generativ gerfertigter Ti—6A1—4V-Bauteile, Galvanotechnik, Leuze Verlag, vol. 107, No. 6, Jun. 1, 2016.
The International Search Report and Written Opinion of PCT/US/2016/065764 dated Mar. 2, 2017.
The International Search Report and Written Opinion of PCT/US2016/065764 dated May 4, 2018.
Bagehorn et al., "Einfluss mechanischer and chemischer Nachbehandlungsverfahren auf die Oberflachenmorphologie generativ gefertigter Ti—6Al—4V-Bauteile", Galvanotechnick, Leuze Verlag, vol. 107, No. 6, Jun. 1, 2016.

* cited by examiner

LUBRICANT COMPOSITIONS FOR SURFACE FINISHING OF MATERIALS

CROSS-REFERENCE TO RELATED APPLICATIONS

This application claims priority to U.S. Provisional Application Ser. No. 62/269,493 filed Dec. 18, 2015, which is herein incorporated by reference in its entirety.

FIELD

The description provides lubricant compositions that improve surface finish and reduce surface roughness in materials derived from additive manufacturing techniques, e.g., 3D printing.

BACKGROUND

Surface finishing, also known as micromachining, microfinishing, and short-stroke honing, relates to a broad range of industrial processes that alter the surface of a manufactured item. For example, surface finishing processes may be employed to improve or modify appearance, geometry, adhesion or wettability, solderability, corrosion resistance, tarnish resistance, chemical resistance, wear resistance, hardness, electrical conductivity, burrs and other surface flaws, and control the surface friction. Well known mechanical surface finishing processes include, e.g., abrasive blasting, sandblasting, burnishing, grinding, mass finishing processes, tumble finishing, vibratory finishing, polishing, buffing, or lapping. It has been proven that surface finishing certain parts makes them more durable. For example, if the teeth in a gear are superfinished they can last up to four times as long. Other commonly superfinished mechanical parts include steering rack components, transmission components, fuel injector components, camshaft lobes, hydraulic cylinder rods, bearing races, needle rollers, and sharpening stones and wheels.

In certain applications, surface finishing processes are utilized to finish surfaces of mechanical components and equipment in order to gain improved performance and lubricant-related efficiencies. For example, achieving high energy efficiency in, e.g., an internal combustion engine, as well as other mechanical systems, often requires that certain lubricated components have very low surface roughness. This is achieved by removing just the thin amorphous surface layer left by the last process with an abrasive stone or tape; this layer is usually about 1 µm in magnitude. Surface finishing, unlike polishing which produces a mirror finish, creates a cross-hatch pattern on the work-piece, and can give a surface finish of 0.01 µm.

Recent advances in additive manufacturing (AM) have resulted in its emergence as a potential alternative to traditional metal manufacturing. AM processes include technologies that build 3D objects by adding layer-upon-layer of material, whether the material is plastic, metal, concrete or even tissue. The term AM encompasses 3D Printing, Rapid Prototyping (RP), Direct Digital Manufacturing (DDM), layered manufacturing and additive fabrication.

Additive manufacturing processes, e.g., 3D printing, can advantageously produce finished materials and structural components, often in a single manufacturing step, and often at low cost. However, the raw surfaces of such AM materials have typical surface roughness that are significantly greater than the roughness of surfaces typically used in lubricated mechanical components found in diverse mechanical systems, including internal combustion engines. As such, 3D-printed materials having rough surfaces would be seriously disadvantaged in providing maximum energy efficiency. As such, most mechanical components requiring smooth surface finishes, such as, for example internal combustion (IC) engine parts, are made with traditional mechanical surface finishing processes such as those described above.

Moving mechanical components typically require lubricating oils. Lubricating oils perform numerous functions, including, for example, reducing friction and wear of numerous parts in moving contact with each other, such as engine piston rings and cylinder walls, valves, cams, bearings, etc. The same can be said for lubricating oils other than engine oils, such as transmission fluids, hydraulic oils, gear oils, turbine oils, functional fluids, industrial oils, which all function to lubricate parts in moving relationship with each other. Lubricant-related energy efficiency performance is highly desirable due to increasingly stringent governmental regulations for vehicle fuel consumption and carbon emissions. At the same time, lubricants need to provide a substantial level of wear control and high temperature performance due to the proliferation of smaller and higher output modern engine designs.

Lubricant-related performance characteristics such as wear control, high and low temperature deposit control, high temperature varnish control, and fuel economy are extremely advantageous attributes. However, it would be advantageous to avoid the additional step of surface finishing mechanical components prior to use in lubricated systems, e.g., combustion engines. In order to greater enhance energy efficiencies, there exists in the art an ongoing need for lubricant compositions that achieve wear, deposit, and varnish control, while also maintaining energy efficiency over a broad temperature range when in contact with a diverse range of materials and surface finishes, including in AM materials.

SUMMARY

The present description relates to lubricant compositions and methods of using the same that surprisingly and unexpectedly improve the surface finish of additive manufactured, e.g., 3D printed, materials used in mechanical systems. In particular, it was surprisingly and unexpectedly discovered that the described compositions reduce the surface roughness without the need for traditional intermediate step of surface finishing to improving wear control, deposits and varnish, and also maintaining or improving energy efficiency.

Thus, in one aspect, the description provides a method of improving friction, wear, and other lubricant performances of an AM component, article or material or machine, device or system including an additive manufactured article, component or material comprising the steps of providing an AM component, article or material machine, device or system comprising an additive manufactured component, article or material, and adding a lubricant composition as described herein to the machine, device or system, wherein the lubricant composition improves friction wear or other lubricant performance.

In an additional aspect, the description provides a machine, article or system comprising an additive manufactured article, and an effective amount of a lubricant composition as described herein, wherein the lubricant composition improves friction wear or other lubricant performance.

The description provides lubricant compositions comprising from about 50% by weight (wt %) to about 98 wt % of a lubricant fluid base stock in combination with at least one surface reactive component. In certain embodiments, the lubricant composition comprises an effective amount of a surface reactive component sufficient to reduce the surface roughness of an additive manufactured (AM) material. In certain embodiments, the surface reactive component comprises, for example, a friction modifier, friction reducer, antiwear additive, viscosity modifier, extreme pressure additive, dispersant, detergent, antioxidant, anti-corrosive additive, and/or a combination thereof, which are effective at improving the surface finish (i.e., reducing the roughness) of a material.

In certain embodiments, the lubricant composition comprises a lubricant fluid. In certain embodiments, the lubricant fluid comprises, for example, a mineral oil, a synthetic or natural fluid of lubricating viscosity. In certain embodiments, the lubricant fluid comprises a member selected from the group consisting of hydrogenated polyalphaolefin (PAO), a Group V base stock such as alkylated naphthalene, a Group II base stock, a Group III base stock, and a combination thereof.

In certain embodiments, the surface reactive component comprises at least one of an antiwear additive, a friction modifier or combination thereof. In certain additional embodiments, the lubricant composition comprises from about 0.01 wt % to about 5 wt % of a friction modifier. In still additional embodiments, the lubricant composition comprises from about 0.01 wt % to about 5 wt % of an antiwear agent.

In certain embodiments, the antiwear additive comprises a member selected from the group consisting of a metal-containing dialkyl dithiophosphate, metal-containing antiwear additive, metal-free antiwear additive, metal stearate, ashless phosphate, dithiocarbamate, sulfur-containing antiwear additives, sulfur-phosphorus-containing additives, carboxylates, carboxylate salts, and a combination thereof. In certain embodiments, the antiwear additive is zinc dialkyl dithiophosphate (ZDDP).

In additional embodiments, the friction modifier comprises at least one of a metal-containing friction modifier, an organic friction modifier or a combination thereof. In certain embodiments, the friction modifier is an organic friction modifier.

In additional embodiments, the friction modifier comprises at least one of an effective metal, metalloid, rare earth metal or combination thereof. In additional embodiments, the metal-containing friction modifier comprises at least one effective metal, or metalloid selected from the group consisting of Al, Ba, Bi, Ca, Cd, Co, Cr, Cu, Fe, K, Li, Mg, Mo, Na, Ni, P, Si, Sn, Ti, W, Zn, Zr, Y, rare earth metal, or a combination thereof. In certain embodiments, the effective metal comprises at least one of Mo, P, or Zn. In certain embodiments, the metal-containing friction modifier comprises less than 90%, 80%, 70%, 60%, 50%, 40%, 30%, 20%, 10%, 5%, or 1% by weight of an effective metal.

In certain additional embodiments, the lubricant composition comprises from about 0.1 ppm to about 2000 ppm of a metal-containing friction modifier. In additional embodiments, the lubricant composition comprises from about 0.01 ppm to about 200 ppm of a Mo-containing friction modifier. In additional embodiments, the lubricant composition comprises from about 0.01 ppm to about 2000 ppm of a P-containing antiwear additive. In certain embodiments, the lubricant composition comprises from about 0.01 ppm to about 2000 ppm of a Zn-containing antiwear additive.

In still additional embodiments, the friction modifier comprises at least one of a long chain alkyl thiocarbamides, mixed glyceride esters (substituted or unsubstituted), ethoxylated fatty esters, phenyl phosphorothionates, triphenyl phosphorothionate (TPPT), cresyl phosphates, tricresyl phosphate (TCP) or combination thereof. In certain embodiments, the friction modifier comprises at least one of Molybedum-containing friction modifiers, Organic friction modifiers, or a combination thereof.

In certain embodiments, the organic friction modifier comprises at least one member selected from the group consisting of glycerol monooleate, alkoxylated alcohol, stearyl ether, alkylene glycol, fatty acid-based ester, fatty acid-based amide, salicylate, carboxylate, polymeric ester, and combinations thereof.

In an additional aspect, the description provides a method of reducing the surface roughness of a component, article or material, such as, for example, an additive manufactured (AM) material or 3D printed material, comprising the steps of providing a lubricant composition as described herein, and providing a component, article or material having an initial roughness, e.g., a first surface roughness ($Ra_1$), applying the lubricant composition to the component, article or material; and introducing or applying a frictional force to the component, article or material, wherein the lubricant composition reduces the surface roughness of the component, article or material resulting in a second surface roughness ($Ra_2$) that is less than the first surface roughness. In certain additional embodiments, the first surface roughness ($Ra_1$) is reduced by at least 1%, 2%, 3%, 4%, 5%, 6%, 7%, 8%, 9%, 10% or more. In further embodiments, the first surface roughness is reduced by at least 10%, 20%, 30%, 40%, 50%, 60%, 70%, 80%, 90% or more.

In certain embodiments, the material has an initial roughness ($Ra_1$) of at least 10 µm, 8 µm, 6 µm, 5 µm, 4 µm, 3 µm, 2 µm, 1 µm, 0.5 µm, 0.3 µm, 0.1 µm, 0.05 µm or 0.01 µm, including all values in between.

In certain embodiments, the second surface roughness ($Ra_2$) is ≤8 µm, ≤5 µm, ≤2 µm, ≤1 µm, ≤0.5 µm, ≤0.2 µm, ≤0.1 µm, ≤0.05 µm, ≤0.03 µm, ≤0.02 µm, or ≤0.01 µm, including all values in between.

In certain embodiments, the material comprises at least one of a polymer, metal, coating, non-metallic material, an alloy, cermet, ceramic, or a combination thereof. In additional embodiments, the alloy comprises a member selected from the group consisting of austenitic stainless steels, duplex steels, tool steels (& maraging steels), low alloy steels, cobalt alloys, nickel alloys, copper alloys, bismuth alloys, titanium alloys, rare earth element type alloys, MCrAlY alloys, aluminum alloys, tin alloys, bronze alloys, and combinations thereof.

In certain embodiments, the combination of lubricant composition and a 3D-printed material may be suitably demonstrated by testing using a mini-traction machine (MTM) under conditions of 0.5-2 GPa pressure, 50-200° C., a mean speed of 50-500 mm/s, and 250% slide-to-roll ratio (SRR).

In certain embodiments, the frictional force is applied at 1.00 GPa pressure. In some embodiments, the frictional force is applied at a temperature of 140° C. In additional embodiments, the frictional force is applied at a mean speed of 100 mm/s.

In an additional aspect, the description provides a machine, device or system comprising a non-surface finished component, article or material and the lubricant composition as described herein. In certain embodiments, the machine, device or system is an engine, for example, a combustion engine. In certain additional embodiments, the non-surface finished component within the article is at least one of a disc, gear, steering rack component, transmission component, fuel injector component, camshaft lobe, hydraulic cylinder rod, bearing, bearing race, needle roller, sharpening stone, wheel or a combination thereof. In certain additional embodiments, the component is a biomedical component such as a joint, socket, brace, plate, pin, support, stent, or the like.

Where applicable or not specifically disclaimed, any one of the embodiments described herein are contemplated to be able to combine with any other one or more embodiments, even though the embodiments are described under different aspects of the invention.

The preceding general areas of utility are given by way of example only and are not intended to be limiting on the scope of the present disclosure and appended claims. Additional objects and advantages associated with the compositions, methods, and processes of the present disclosure will be appreciated by one of ordinary skill in the art in light of the instant claims, description, and examples. For example, the various aspects and embodiments of the disclosure may be utilized in numerous combinations, all of which are expressly contemplated by the present description. These additional advantages objects and embodiments are expressly included within the scope of the present disclosure. The publications and other materials used herein to illuminate the background of the disclosure, and in particular cases, to provide additional details respecting the practice, are incorporated by reference.

DETAILED DESCRIPTION

Presently described are compositions and methods of using the same that surprisingly and unexpectedly perform well to do at least one of the following: improve the surface finish, reduce wear, reduce deposits, reduce varnish or improve energy efficiency of additive manufactured, e.g., 3D printed, materials used in mechanical systems. In particular, it was surprisingly and unexpectedly discovered that the described compositions reduce the surface roughness of materials, e.g., additive manufactured materials or 3D printed materials, without the need for traditional intermediate step of surface finishing. For example, the description provides lubricant compositions that comprise of combinations of lubricant additives (i.e., friction modifiers, antiwear, viscosity modifiers, dispersants, detergents, antioxidants, base stocks), which are unexpectedly highly effective at improving the surface finish of a range of materials and equipment, including, e.g., materials that are manufactured using 3D printing. In particular, friction modifiers and antiwear additives are employed to decrease surface roughness of materials and equipment in concert with maximizing energy efficiency.

The following is a detailed description of the disclosure provided to aid those skilled in the art in practicing the present disclosure. Those of ordinary skill in the art may make modifications and variations in the embodiments described herein without departing from the spirit or scope of the present disclosure. Unless otherwise defined, all technical and scientific terms used herein have the same meaning as commonly understood by one of ordinary skill in the art to which this disclosure belongs. The terminology used in the description of the disclosure herein is for describing particular embodiments only and is not intended to be limiting of the disclosure. All publications, patent applications, patents, figures and other references mentioned herein are expressly incorporated by reference in their entirety.

Where a range of values is provided, it is understood that each intervening value, to the tenth of the unit of the lower limit unless the context clearly dictates otherwise (such as in the case of a group containing a number of carbon atoms in which case each carbon atom number falling within the range is provided), between the upper and lower limit of that range and any other stated or intervening value in that stated range is encompassed within the disclosure. The upper and lower limits of these smaller ranges may independently be included in the smaller ranges is also encompassed within the disclosure, subject to any specifically excluded limit in the stated range. Where the stated range includes one or both of the limits, ranges excluding either both of those included limits are also included in the disclosure.

It should also be understood that, unless clearly indicated to the contrary, in any methods claimed herein that include more than one step or act, the order of the steps or acts of the method is not necessarily limited to the order in which the steps or acts of the method are recited.

The following terms are used to describe the present disclosure. In instances where a term is not specifically defined herein, that term is given an art-recognized meaning by those of ordinary skill applying that term in context to its use in describing the present disclosure.

The articles "a" and "an" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

The term "about" or "approximately" means an acceptable error for a particular value as determined by one of ordinary skill in the art, which depends in part on how the value is measured or determined. All numerical values within the detailed description and the claims herein are modified by "about" or "approximately" the indicated value, and take into account experimental error and variations that would be expected by a person having ordinary skill in the art.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the 10 United States Patent Office Manual of Patent Examining Procedures, Section 2111.03.

As used herein in the specification and in the claims, the phrase "at least one," in reference to a list of one or more elements, should be understood to mean at least one element selected from anyone or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a nonlimiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

As used herein, unless the context indicates otherwise, the term "surface roughness" or "roughness" (R) is used in reference to a surface feature of a manufactured item, e.g., a metallic or alloy component, such as, e.g., for use in a mechanical system. R is quantified by the deviations in the direction of the normal vector of a real surface from its ideal form. If these deviations are large, the surface is rough; if they are small, the surface is smooth. As used herein, Ra refers to the arithmetic mean or average, while Rq refers to the root mean squared roughness value. See Degarmo, E. Paul; Black, J.; Kohser, Ronald A. (2003), Materials and Processes in Manufacturing (9th ed.), Wiley, p. 223, which is incorporated herein by reference.

Compositions

It is known that adding friction modifiers to a lubricant formulation imparts frictional benefits at low temperatures, consequently improving the lubricant energy efficiency performance. Furthermore, maximum energy efficiency can be achieved by reducing friction in an engine through use of lubricants containing friction modifiers. Friction modifiers used to impart low friction properties in a finished lubricant are traditionally employed for such purposes as improved efficiency in internal combustion engines containing super-finished materials.

Lubricant-related wear control is also highly desirable due to increasing use of low viscosity engine oils for improved fuel efficiency. As governmental regulations for vehicle fuel consumption and carbon emissions become more stringent, use of low viscosity engine oils to meet the regulatory standards is becoming more prevalent. At the same time, lubricants need to provide a substantial level of durability and wear protection due to the formation of thinner lubricant films during engine operation. As such, use of antiwear additives in a lubricant formulation is the typical method for achieving wear control and durability in current internal combustion engines using super-finished materials and equipment.

A major challenge exists in lubricant formulation for mechanical systems, e.g., engines, to simultaneously achieve wear control while maximizing energy efficiency when the lubricant composition is used together with materials and equipment that has not been surface finished or has significantly higher surface roughness than typically used, e.g., additive manufactured (AM) or 3D printed materials and equipment.

It was surprisingly and unexpectedly discovered that the described compositions reduce the surface roughness of additive manufactured (AM) materials, e.g., metallic, alloy based materials, coated materials, and polymeric materials, without the need for traditional intermediate step of surface finishing, and at the same time, controls wear, deposits and varnish, and also maintains or improves energy efficiency. In particular, lubricant compositions comprising a major proportion of hydrocarbyl-type fluid and a minor proportion of metal surface reactive components are beneficially used to improve the surface finish, i.e. lower the surface roughness, of raw AM materials that are used as components in lubricated mechanical systems.

Thus, in a first aspect, the description provides lubricant compositions comprising a lubricant fluid and a surface reactive component. In certain embodiments, the lubricant composition comprises an effective amount of a surface reactive component sufficient to reduce the surface roughness of an additive manufactured (AM) material. In certain embodiments, the lubricant composition comprises from about 50% by weight (wt %) to about 98 wt % of a lubricant fluid base stock in combination with at least one surface reactive component. In certain embodiments, the lubricant description consists of or consists essentially of a lubricant fluid and an effective amount of a surface reactive component.

In certain embodiments, the AM material is a 3D printed material.

As used herein, the term "effective amount" is used to describe an amount sufficient to achieve or effectuate a desired result, e.g., an amount sufficient to lubricate and reduce the roughness of a surface to a desired level.

In certain embodiments, the lubricant composition comprises a lubricant fluid. In certain embodiments, the lubricant fluid comprises, for example, a mineral oil, a synthetic or natural fluid of lubricating viscosity. In certain embodiments, the lubricant fluid comprises a at least one of a hydrogenated polyalphaolefin (PAO), a Group V base stock such as alkylated naphthalene, a Group II base stock, a Group III base stock or a combination thereof.

A wide range of lubricating oils is known in the art. Lubricating oils that are useful in the present disclosure are both natural oils and synthetic oils. Natural and synthetic oils (or mixtures thereof) can be used unrefined, refined, or rerefined (the latter is also known as reclaimed or reprocessed oil). Unrefined oils are those obtained directly from a natural or synthetic source and used without added purification. These include shale oil obtained directly from retorting operations, petroleum oil obtained directly from primary distillation, and ester oil obtained directly from an esterification process. Refined oils are similar to the oils discussed for unrefined oils except refined oils are subjected to one or more purification steps to improve the at least one lubricating oil property. One skilled in the art is familiar with many purification processes. These processes include solvent extraction, secondary distillation, acid extraction, base extraction, filtration, and percolation. Rerefined oils are obtained by processes analogous to refined oils but using an oil that has been previously used as a feed stock.

Almost every lubricant starts off as just a base oil. The American Petroleum Institute (API) has categorized base oils into five categories (Groups I, II, III, IV, and V; API Publication 1509, Appendix E). The first three groups are refined from petroleum crude oil.

Group I base oils are classified as less than 90 percent saturates, greater than 0.03 percent sulfur and with a viscosity-index range of 80 to 120. The temperature range for these oils is from 32 to 150° F. Group I base oils are solvent-refined, which is a simpler refining process. This is why they are the cheapest base oils on the market.

Group II base oils are defined as being more than 90 percent saturates, less than 0.03 percent sulfur and with a viscosity index of 80 to 120. They are often manufactured by hydrocracking, which is a more complex process than what is used for Group I base oils. Since all the hydrocarbon molecules of these oils are saturated, Group II base oils have better antioxidancy. They also have a clearer color and cost more in comparison to Group I base oils.

Group III base oils are greater than 90 percent saturates, less than 0.03 percent sulfur and have a viscosity index above 120. These oils are refined even more than Group II base oils and generally are severely hydrocracked (higher pressure and heat). This longer process is designed to achieve a purer base oil. Although made from crude oil, Group III base oils are sometimes described as synthetic hydrocarbons.

Group IV base oils are polyalphaolefins (PAOs). These synthetic base oils are made through a process called synthesizing. They have a much broader temperature range and are great for use in extreme cold conditions and high heat applications.

Group V base oils are classified as all other base oils not included in Groups I-IV, including silicone, phosphate ester, polyalkylene glycol (PAG), polyolester, biolubes, alkylated naphthalane, synthetic esters, etc. These base oils are at times mixed with other base stocks to enhance the oil's properties. An example would be a PAO-based compressor oil that is mixed with a polyolester. Esters are common Group V base oils used in different lubricant formulations to improve the properties of the existing base oil. Ester oils are stable at higher temperatures and will provide superior detergency compared to a PAO synthetic base oil, which in turn increases the hours of use.

The table below summarizes properties of each of these five groups.

| | Base Oil Properties | | |
|---|---|---|---|
| | Saturates | Sulfur | Viscosity Index |
| Group I | <90 and/or | >0.03% and | ≥80 and <120 |
| Group II | ≥90 and | ≤0.03% and | ≥80 and <120 |
| Group III | ≥90 and | ≤0.03% and | ≥120 |
| Group IV | Includes polyalphaolefins (PAO) products | | |
| Group V | All other base oil stocks not included in Groups I, II, III or IV | | |

Different types of base stocks have different performance characteristics. Ester base stocks, for example, the neopentylpolyol esters such as the pentaerythritol esters of monobasic carboxylic acids, have excellent high performance properties as indicated by their common use in gas turbine lubricants. They also provide excellent anti-wear characteristics when conventional anti-wear additives are present and they do not have any adverse effect on the performance of rust inhibitors. On the other hand, esters have relatively poor hydrolytic stability, undergoing hydrolysis readily in the presence of water at even moderate temperatures. They are, therefore, less well suited for use in wet applications such as paper-making machinery.

Hydrolytic stability can be improved by the use of hydrocarbon base stocks. The use of alkyl aromatics in combination with the other hydrocarbon base stocks such as hydrogenated polyalphaolefin (PAO) synthetic hydrocarbons and the improved hydrolytic stability of these combinations is described, for example, in U.S. Pat. No. 5,602,086. Traditional formulations containing PAO's, however, present other performance problems. Although the hydrolytic stability of hydrocarbon base stocks including PAO's is superior to that of the esters, it is frequently difficult to obtain a good balance of the surface-related properties such as anti-wear and anti-rust because, these surface-related properties are dependent upon the extent to which the additives present in the base stock compete for sites on the metal surfaces which they are intended to protect and high quality hydrocarbon base stocks such as PAO's do not favorably interact with the additives used for this purpose.

Natural oil, other synthetic oils, and other unconventional oils and mixtures thereof, suitable for use in the aspects and embodiments described herein, can be used unrefined, refined, or rerefined (the latter is also known as reclaimed or reprocessed oil). Unrefined oils are those obtained directly from a natural, synthetic or unconventional source and used without further purification. These include for example shale oil obtained directly from retorting operations, oils derived from coal, petroleum oil obtained directly from primary distillation, and ester oil obtained directly from an esterification process. Refined oils are similar to the oils discussed for unrefined oils except refined oils are subjected to one or more purification or transformation steps to improve at least one lubricating oil property. One skilled in the art is familiar with many purification or transformation processes. These processes include, for example, solvent extraction, secondary distillation, acid extraction, base extraction, filtration, percolation, hydrogenation, hydrorefining, and hydrofinishing. Rerefined oils are obtained by processes analogous to refined oils, but use an oil that has been previously used.

Natural oils include animal oils, vegetable oils (castor oil and lard oil, for example), and mineral oils. Animal and vegetable oils possessing favorable thermal oxidative stability can be used. Of the natural oils, mineral oils are preferred. Mineral oils vary widely as to their crude source, for example, as to whether they are paraffinic, naphthenic, or mixed paraffinic-naphthenic. Oils derived from coal or shale are also useful in the present disclosure. Natural oils vary also as to the method used for their production and purification, for example, their distillation range and whether they are straight run or cracked, hydrorefined, or solvent extracted.

Group II and/or Group III hydroprocessed or hydrocracked base stocks, as well as synthetic oils such as polyalphaolefins, alkyl aromatics and synthetic esters, i.e. Group IV and Group V oils are also well known base stock oils.

Synthetic oils include hydrocarbon oils as well as non-hydrocarbon oils. Synthetic oils can be derived from processes such as chemical combination (for example, polymerization, oligomerization, condensation, alkylation, acylation, etc.), where materials consisting of smaller, simpler molecular species are built up (i.e., synthesized) into materials consisting of larger, more complex molecular species. Synthetic oils include hydrocarbon oils such as polymerized and interpolymerized olefins (polybutylenes, polypropylenes, propylene isobutylene copolymers, ethylene-olefin copolymers, and ethylene-alphaolefin copolymers, for example). Polyalphaolefin (PAO) oil base stock is a commonly used synthetic hydrocarbon oil. By way of example, PAO's derived from $C_8$, $C_{10}$, $C_{12}$, $C_{14}$ olefins or mixtures thereof may be utilized. See U.S. Pat. Nos. 4,956, 122; 4,827,064; and 4,827,073, which are incorporated herein by reference in their entirety. Group IV oils, that is, the PAO base stocks have viscosity indices preferably greater than 130, more preferably greater than 135, still more preferably greater than 140.

The number average molecular weights of the PAO's, which are known materials and generally available on a major commercial scale from suppliers such as ExxonMobil Chemical Company, Chevron, BP-Amoco, and others, typically vary from about 250 to about 3000, or higher, and PAO's may be made in viscosities up to about 100 mm²/s (100° C.), or higher. In addition, higher viscosity PAO's are commercially available, and may be made in viscosities up to about 3000 mm²/S (100° C.), or higher. The PAO's are typically comprised of relatively low molecular weight hydrogenated polymers or oligomers of alpha-olefins which include, but are not limited to, about $C_2$ to about $C_{32}$ alpha-olefins with about $C_8$ to about $C_{16}$ alphaolefins, such as 1-octene, 1-decene, 1-dodecene and the like, being preferred. The preferred polyalphaolefins are poly-1-octene, poly-1-decene and poly-1-dodecene and mixtures thereof and mixed olefin-derived polyolefins. However, the dimers of higher olefins in the range of about $C_{14}$ to $C_{18}$ may be used to provide low viscosity base stocks of acceptably low volatility. Depending on the viscosity grade and the starting oligomer, the PAO's may be predominantly trimers and tetramers of the starting olefins, with minor amounts of the higher oligomers, having a viscosity range of about 1.5 to 12 mm²/s.

PAO fluids may be conveniently made by the polymerization of an alphaolefin in the presence of a polymerization catalyst such as the Friedel-Crafts catalysts including, for example, aluminum trichloride, boron trifluoride or complexes of boron trifluoride with water, alcohols such as ethanol, propanol or butanol, carboxylic acids or esters such as ethyl acetate or ethyl propionate. For example the methods disclosed by U.S. Pat. Nos. 4,149,178 or 3,382,291 may be conveniently used herein. Other descriptions of PAO synthesis are found in the following U.S. Pat. Nos. 3,742, 082; 3,769,363; 3,876,720; 4,239,930; 4,367,352; 4,413, 156; 4,434,408; 4,910,355; 4,956,122; and 5,068,487. Dimers of the $C_{14}$ to $C_{18}$ olefins are described in U.S. Pat. No. 4,218,330.

Other useful synthetic lubricating base stock oils such as silicon-based oil or esters of phosphorus containing acids may also be utilized. For examples of other synthetic lubricating base stocks are the seminal work "Synthetic Lubricants", Gunderson and Hart, Reinhold Publ. Corp., NY 1962.

In alkylated aromatic stocks such as mono- or poly-alkylbenzenes or mono- or poly-alkyl naphthalenes, the alkyl substituents are typically alkyl groups of about 8 to 25 carbon atoms, usually from about 10 to 18 carbon atoms and up to about three such substituents may be present, as described for the alkyl benzenes in ACS Petroleum Chemistry Preprint 1053-1058, "Poly n-Alkylbenzene Compounds: A Class of Thermally Stable and Wide Liquid Range Fluids", Eapen et al, Phila. 1984. Tri-alkyl benzenes may be produced by the cyclodimerization of 1-alkynes of 8 to 12 carbon atoms as described in U.S. Pat. No. 5,055,626. Other alkylbenzenes are described in European Patent Application 168 534 and U.S. Pat. No. 4,658,072. Alkylbenzenes are used as lubricant base stocks, especially for low-temperature applications (arctic vehicle service and refrigeration oils) and in papermaking oils. They are commercially available from producers of linear alkylbenzenes (LABs) such as Vista Chem. Co., Huntsman Chemical Co., Chevron Chemical Co., and Nippon Oil Co. Linear alkyl-benzenes typically have good low pour points and low temperature viscosities and VI values greater than about 100, together with good solvency for additives. Other alkylated aromatics which may be used when desirable are described, for example, in "Synthetic Lubricants and High Performance Functional Fluids", Dressler, H., chap 5, (R. L. Shubkin (Ed.)), Marcel Dekker, N Y, 1993.

Alkylated naphthalene is a unique class of synthetic fluids with outstanding thermooxidative and hydrolytic stability, low volatility, and good solubility characteristics. Alkylated naphthalenes have the general structure shown below:

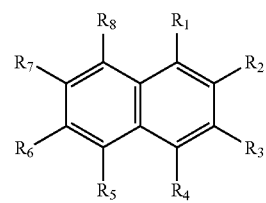

where $R_1$ to $R_8$ are independently linear or branched alkyl groups or hydrogen.

The core naphthalene system consists of two fused six membered rings with an electron-rich, conjugated π system. It is this extended aromatic system that imparts the unique thermooxidative stability to this class of compounds. However, the alkyl groups attached to the naphthalene also can make an important contribution to the characteristics of the compound. In particular, the alkyl groups control most of the physical characteristics of the compound, such as viscosity, pour point, and volatility. The physical properties of the material will primarily depend on the length of the alkyl group, as well as the number of alkyl groups on the naphthalene ring.

Alkylated naphthalenes are most easily prepared by the Friedel-Crafts alkylation of naphthalene with an alkylating agent in the presence of an acid catalyst. Although almost any alkylating agent, such as an alcohol, an alkyl halide, or an olefin, may be used, the most commonly used alkylating agent is an olefin. Out of many possible alkylating olefins, the most commonly used olefin for a lubricant base stock is an alpha-olefin in which the double bond resides at one terminus of the alkyl chain. Under normal Friedel-Crafts conditions the reaction produces a complex mixture of alkylated naphthalenes having different numbers of alkyl groups on the naphthalene ring.

The naphthalene alkylation reaction depends on many factors such as the catalyst type, temperature, ratio of the alkylating agent to naphthalene, and the manner in which the reactants are combined. Many different types of catalysts are suitable for the reaction including Lewis acids, strong protic acids, heterogeneous solid catalysts such as zeolites, or acid-treated clays.

Alkylene oxide polymers and interpolymers and their derivatives containing modified terminal hydroxyl groups obtained by, for example, esterification or etherification are useful synthetic lubricating oils. By way of example, these oils may be obtained by polymerization of ethylene oxide or propylene oxide, the alkyl and aryl ethers of these polyoxyalkylene polymers (methyl-polyisopropylene glycol ether having an average molecular weight of about 1000, diphenyl ether of polyethylene glycol having a molecular weight of about 500-1000, and the diethyl ether of polypropylene glycol having a molecular weight of about 1000 to 1500, for example) or mono- and poly-carboxylic esters thereof (the acidic acid esters, mixed $C_{3-8}$ fatty acid esters, or the $C_{13}$ Oxo acid diester of tetraethylene glycol, for example).

Esters comprise a useful base stock. Additive solvency and seal compatibility characteristics may be secured by the use of esters such as the esters of dibasic acids with monoalkanols and the polyol esters of mono-carboxylic acids. Esters of the former type include, for example, the esters of dicarboxylic acids such as phthalic acid, succinic acid, alkyl succinic acid, alkenyl succinic acid, maleic acid, azelaic acid, suberic acid, sebacic acid, fumaric acid, adipic acid, linoleic acid dimer, malonic acid, alkyl malonic acid, alkenyl malonic acid, etc., with a variety of alcohols such as butyl alcohol, hexyl alcohol, dodecyl alcohol, 2-ethylhexyl alcohol, etc. Specific examples of these types of esters include dibutyl adipate, di(2-ethylhexyl)sebacate, di-n-hexyl fumarate, dioctyl sebacate, diisooctyl azelate, diisodecyl azelate, dioctyl phthalate, didecyl phthalate, dieicosyl sebacate, etc.

Particularly useful synthetic esters are those full or partial esters which are obtained by reacting one or more polyhydric alcohols (preferably the hindered polyols such as the neopentyl polyols e.g. neopentyl glycol, trimethylol ethane, 2-methyl-2-propyl-1,3-propanediol, trimethylol propane, pentaerythritol and dipentaerythritol) with alkanoic acids containing at least about 4 carbon atoms (preferably $C_5$ to $C_{30}$ acids such as saturated straight chain fatty acids including caprylic acid, capric acid, lauric acid, myristic acid, palmitic acid, stearic acid, arachic acid, and behenic acid, or the corresponding branched chain fatty acids or unsaturated fatty acids such as oleic acid).

Suitable synthetic ester components include the esters of trimethylol propane, trimethylol butane, trimethylol ethane, pentaerythritol and/or dipentaerythritol with one or more monocarboxylic acids containing from about 5 to about 10 carbon atoms. Esters should be used in an amount such that the improved wear and corrosion resistance provided by the lubricating oils of this disclosure are not adversely affected.

Silicon-based oils are another class of useful synthetic lubricating oils. These oils include polyalkyl-, polyaryl-, polyalkoxy-, and polyaryloxy-siloxane oils and silicate oils. Examples of suitable silicon-based oils include tetraethyl silicate, tetraisopropyl silicate, tetra-(2-ethylhexyl)silicate, tetra-(4-methylhexyl)silicate, tetra-(p-tert-butylphenyl)silicate, hexyl-(4-methyl-2-pentoxy)disiloxane, poly(methyl) siloxanes, and poly-(methyl-2-methylphenyl)siloxanes.

Another class of synthetic lubricating oil is esters of phosphorous-containing acids. These include, for example, tricresyl phosphate, trioctyl phosphate, diethyl ester of decanephosphonic acid.

Another class of synthetic oils includes polymeric tetrahydrofurans, their derivatives, and the like.

Other useful fluids of lubricating viscosity include non-conventional or unconventional base stocks that have been processed, preferably catalytically, or synthesized to provide high performance lubrication characteristics.

For a review of many commonly used additives see Klamann in "Lubricants and Related Products, Verlag Chemie, Deerfield Beach, Fla.; ISBN 0-89573-177-0, which also gives a good discussion of a number of the lubricant additives identified below. Reference is also made to "Lubricant Additives" by M. W. Ranney, published by Noyes Data Corporation of Parkridge, N.J. (1978).

Non-conventional or unconventional base stocks and/or base oils include one or a mixture of base stock(s) and/or base oil(s) derived from: (1) one or more Gas-to-Liquids (GTL) materials, as well as (2) hydrodewaxed, or hydroisomerized/cat (and/or solvent) dewaxed base stock(s) and/or base oils derived from synthetic wax, natural wax or waxy feeds, mineral and/or non-mineral oil waxy feed stocks such as gas oils, slack waxes (derived from the solvent dewaxing of natural oils, mineral oils or synthetic oils; e.g., Fischer-Tropsch feed stocks), natural waxes, and waxy stocks such as gas oils, waxy fuels hydrocracker bottoms, waxy raffinate, hydrocrackate, thermal crackates, foots oil or other mineral, mineral oil, or even non-petroleum oil derived waxy materials such as waxy materials recovered from coal liquefaction or shale oil, linear or branched hydrocarbyl compounds with carbon number of about 20 or greater, preferably about 30 or greater and mixtures of such base stocks and/or base oils.

GTL materials are materials that are derived via one or more synthesis, combination, transformation, rearrangement, and/or degradation/deconstructive processes from gaseous carbon-containing compounds, hydrogen-containing compounds and/or elements as feed stocks such as hydrogen, carbon dioxide, carbon monoxide, water, methane, ethane, ethylene, acetylene, propane, propylene, propyne, butane, butylenes, and butynes. GTL base stocks and/or base oils are GTL materials of lubricating viscosity that are generally derived from hydrocarbons; for example, waxy synthesized hydrocarbons, that are themselves derived from simpler gaseous carbon-containing compounds, hydrogen-containing compounds and/or elements as feed stocks. GTL base stock(s) and/or base oil(s) include oils boiling in the lube oil boiling range (1) separated/fractionated from synthesized GTL materials such as, for example, by distillation and subsequently subjected to a final wax processing step which involves either or both of a catalytic dewaxing process, or a solvent dewaxing process, to produce lube oils of reduced/low pour point; (2) synthesized wax isomerates, comprising, for example, hydrodewaxed or hydroisomerized cat and/or solvent dewaxed synthesized wax or waxy hydrocarbons; (3) hydrodewaxed or hydroisomerized cat and/or solvent dewaxed Fischer-Tropsch (F-T) material (i.e., hydrocarbons, waxy hydrocarbons, waxes and possible analogous oxygenates); preferably hydrodewaxed or hydroisomerized/followed by cat and/or solvent dewaxing dewaxed F-T waxy hydrocarbons, or hydrodewaxed or hydroisomerized/followed by cat (or solvent) dewaxing dewaxed, F-T waxes, or mixtures thereof.

GTL base stock(s) and/or base oil(s) derived from GTL materials, especially, hydrodewaxed or hydroisomerized/followed by cat and/or solvent dewaxed wax or waxy feed, preferably F-T material derived base stock(s) and/or base oil(s), are characterized typically as having kinematic viscosities at 100° C. of from about 2 mm$^2$/s to about 50 mm$^2$/s (ASTM D445). They are further characterized typically as having pour points of −5° C. to about −40° C. or lower (ASTM D97). They are also characterized typically as having viscosity indices of about 80 to about 140 or greater (ASTM D2270).

In addition, the GTL base stock(s) and/or base oil(s) are typically highly paraffinic (>90% saturates), and may contain mixtures of monocycloparaffins and multicycloparaffins in combination with non-cyclic isoparaffins. The ratio of the naphthenic (i.e., cycloparaffin) content in such combinations varies with the catalyst and temperature used. Further, GTL base stock(s) and/or base oil(s) and hydrodewaxed, or hydroisomerized/cat (and/or solvent) dewaxed base stock(s) and/or base oil(s) typically have very low sulfur and nitrogen content, generally containing less than about 10 ppm, and more typically less than about 5 ppm of each of these elements. The sulfur and nitrogen content of GTL base stock(s) and/or base oil(s) obtained from F-T material, especially F-T wax, is essentially nil. In addition, the absence of phosphorous and aromatics make this material especially suitable for the formulation of low sulfur, sulfated ash, and phosphorus (low SAP) products.

The term GTL base stock and/or base oil and/or wax isomerate base stock and/or base oil is to be understood as embracing individual fractions of such materials of wide viscosity range as recovered in the production process, mixtures of two or more of such fractions, as well as mixtures of one or two or more low viscosity fractions with one, two or more higher viscosity fractions to produce a blend wherein the blend exhibits a target kinematic viscosity.

The GTL material, from which the GTL base stock(s) and/or base oil(s) is/are derived is preferably an F-T material (i.e., hydrocarbons, waxy hydrocarbons, wax).

Base oils for use in the formulated lubricating oils useful in the present disclosure are any of the variety of oils corresponding to API Group I, Group II, Group III, Group IV, Group V oils and mixtures thereof, preferably API Group II, Group III, Group IV, Group V oils and mixtures thereof, more preferably the Group III to Group V base oils due to their exceptional volatility, stability, viscometric and cleanliness features. Minor quantities of Group I stock, such as the amount used to dilute additives for blending into formulated lube oil products, can be tolerated but should be kept to a minimum, i.e. amounts only associated with their use as diluent/carrier oil for additives used on an "as received" basis. Even in regard to the Group II stocks, it is preferred that the Group II stock be in the higher quality range associated with that stock, i.e. a Group II stock having a viscosity index in the range 100<VI<120.

The base stock component of the present lubricating oils will typically be from 50 to 99 weight percent of the total composition (all proportions and percentages set out in this specification are by weight unless the contrary is stated) and more usually in the range of 80 to 99 weight percent.

Glycol Ether Substituted Aryl Compound Base Stock and Cobase Stock Components

Glycol ether substituted aryl compound base stock and cobase stock components useful in this disclosure include, for example, compositions containing one or more compounds represented by the formula: $R_1$—O—$R_2$, wherein $R_1$ is a substituted or unsubstituted aryl or polyaryl group having from about 4 to about 40 carbon atoms, and $R_2$ is the residue of a substituted or unsubstituted glycol ether having from about 4 to about 40 carbon atoms. The composition has a viscosity ($Kv_{100}$) from about 2 to about 10 at 100° C. as determined by ASTM D-445, a viscosity index (VI) from about −100 to about 300 as determined by ASTM D-2270, and a Noack volatility of no greater than 50 percent as determined by ASTM D-5800.

Preferred glycol ether substituted aryl compound base stock and cobase stock components include those in which $R_1$ is substituted or unsubstituted phenyl, benzyl, naphthyl, or diphenyl (e.g., diphenyl amine or diphenyl ether), and $R_2$ is the residue of a substituted or unsubstituted glycol ether ($C_4$-$C_{40}$).

Illustrative glycol ether substituted aryl compound base stock and cobase stock components useful in the present disclosure include, for example, the product of reacting a substituted or unsubstituted aryl halide with a substituted or unsubstituted glycol ether, optionally in the presence of a catalyst, under reaction conditions sufficient to produce the one or more glycol ether substituted aryl compounds.

Illustrative aryl halides useful in the process of this disclosure include, for example, 1-iodonaphthalene, iodobenzene, 1-iodo-4-methylbenzene, 4-iodo,1-2-dimethylbenzene, 4-bromodiphenylamine, 4-bromodiphenylether, and the like.

Illustrative glycol ethers useful in the process of this disclosure include, for example, di(ethylene glycol)butyl ether, di(ethylene glycol) hexyl ether, di(ethylene glycol) dodecyl ether, and the like.

Other illustrative glycol ethers include, for example, di(ethylene glycol) monohexyl ether, tri(ethylene glycol) monomethyl ether, tri(propylene glycol) monomethyl ether, tri(ethylene glycol) monoethyl ether, tri(ethylene glycol) monobutyl ether, di(ethylene glycol) monoethyl ether, di(ethylene glycol) monobutyl ether, tri(propylene glycol) monopropyl ether, tri(propylene glycol) monobutyl ether, poly(ethylene glycol) dodecyl ether (Brij 30), ethylene glycol mono-2-ethylhexyl ether, and the like. By changing the glycol ether molecules, the fluid can be synthesized with various polarity.

Glycol ethers, with both an ether and alcohol functional groups in the same molecule, are one of the most versatile classes of organic solvents. The Dow Chemical Company manufactures glycol ethers in large quantities. DOW glycol ether products are produced through continuous processes of selectively reacting an alcohol (ethanol, butanol, hexanol) with ethylene oxide. Diethylene glycol monohexyl ether [($C_6H_{13}$(OCH$_2$CH$_2$)$_2$OH, Hexyl CARBITOL Solvent) displays a strong hydrocarbon-type solvency.

The glycol ether substituted aryl compound cobase stock component is preferably present in an amount sufficient for providing oxidative stability in the lubricating oil. The glycol ether substituted aryl compound cobase stock component can be present in the lubricating oils of this disclosure in an amount from about 1 to about 50 weight percent, preferably from about 5 to about 30 weight percent, and more preferably from about 10 to about 20 weight percent.

The glycol ether substituted aryl compound base stock component of the present lubricating oils will typically be from 20 to 80 weight percent or from 50 to 99 weight percent of the total composition (all proportions and percentages set out in this specification are by weight unless the contrary is stated) and more usually in the range of 80 to 99 weight percent.

The formulated lubricating oil useful in the present disclosure may additionally contain one or more of the other commonly used lubricating oil performance additives including but not limited to dispersants, other detergents, corrosion inhibitors, rust inhibitors, metal deactivators, other anti-wear agents and/or extreme pressure additives, anti-seizure agents, wax modifiers, viscosity index improvers, viscosity modifiers, fluid-loss additives, seal compatibility agents, other friction modifiers, lubricity agents, anti-staining agents, chromophoric agents, defoamants, demulsifiers, emulsifiers, densifiers, wetting agents, gelling agents, tackiness agents, colorants, and others. For a review of many commonly used additives, see Klamann in Lubricants and Related Products, Verlag Chemie, Deerfield Beach, Fla.; ISBN 0-89573-177-0. Reference is also made to "Lubricant Additives Chemistry and Applications" edited by Leslie R. Rudnick, Marcel Dekker, Inc. New York, 2003 ISBN: 0-8247-0857-1.

The types and quantities of performance additives used in combination with the instant disclosure in lubricant compositions are not limited by the examples shown herein as illustrations.

In certain embodiments, the surface reactive component comprises at least one of a friction modifier, friction reducer, antiwear additive, viscosity modifier, extreme pressure additive, dispersant, detergent, antioxidant, anti-corrosive additive, and/or a combination thereof, which are effective at improving the surface finish (i.e., reducing the roughness) of a material. In certain embodiments, the lubricant composition comprises a lubricant fluid, and at least one of a friction modifier, an antiwear additive or a combination thereof. In certain embodiments, the lubricant composition consists or consists essentially of a lubricant fluid, a friction modifier, and an antiwear additive.

In certain additional embodiments, the lubricant composition comprises from about 0.01 wt % to about 5 wt % of a friction modifier. In still additional embodiments, the lubricant composition comprises from about 0.01 wt % to about 5 wt % of an antiwear agent.

In certain embodiments, the antiwear additive comprises a member selected from the group consisting of a metal-containing dialkyl dithiophosphate, metal-containing antiwear additive, metal-free antiwear additive, metal stearate, ashless phosphate, dithiocarbamate, sulfur-containing antiwear additives, sulfur-phosphorus-containing additives, carboxylates, carboxylate salts, and a combination thereof. In certain embodiments, the antiwear additive is zinc dialkyl dithiophosphate (ZDDP).

In certain embodiments, lubricant compositions described herein are formulated to include anti-corrosion additives. Surface active metal passivators are included into the lubricating oil to interact with the surfaces of the metal parts and render the metal resistant to the action of corrosive materials, be they other additives or accumulated contaminants, in the lubricating oils.

In additional embodiments, the friction modifier comprises at least one of a metal-containing friction modifier, an organic friction modifier or a combination thereof. In certain embodiments, the friction modifier is an organic friction modifier.

In certain embodiments, the friction modifier and/or antiwear additive comprises at least one of an effective metal, metalloid, rare earth metal or combination thereof. In additional embodiments, the effective metal, or metalloid comprises a member selected from the group consisting of Al, Ba, Bi, Ca, Cd, Co, Cr, Cu, Fe, K, Li, Mg, Mo, Na, Ni, P, Si, Sn, Ti, W, Zn, Zr, Y, rare earth metal, or a combination thereof. In certain embodiments, the effective metal comprises at least one of Mo, or Zn.

In certain embodiments, the metal-containing friction modifier comprises less than 90%, 89%, 88%, 87%, 86%, 85%, 84%, 83%, 82%, 81%, 80%, 79%, 78%, 77%, 76%, 75%, 74%, 73%, 72%, 71%, 70%, 69%, 68%, 67%, 66%, 65%, 64%, 63%, 62%, 61%, 60%, 59%, 58%, 57%, 56%, 55%, 54%, 53%, 52%, 51%, 50%, 49%, 48%, 47%, 46%, 45%, 44%, 43%, 42%, 41%, 40%, 39%, 38%, 37%, 36%, 35%, 34%, 33%, 32%, 31%, 30%, 29%, 28%, 27%, 26%, 25%, 24%, 23%, 22%, 21%, 20%, 19%, 18%, 17%, 16%, 15%, 14%, 13%, 12%, 11%, 10%, 9%, 8%, 7%, 6%, 5%, 4%, 3%, 2%, or 1% by weight of an effective metal.

A friction modifier is any material or materials that can alter the coefficient of friction of a surface lubricated by any lubricant or fluid containing such material(s). Friction modifiers, also known as friction reducers, or lubricity agents or oiliness agents, and other such agents that change the ability of base oils, formulated lubricant compositions, or functional fluids, to modify the coefficient of friction of a lubricated surface may be effectively used in combination with the base oils or lubricant compositions of the present disclosure if desired. Friction modifiers that lower the coefficient of friction are particularly advantageous in combination with the base oils and lube compositions of this disclosure. Friction modifiers may include metal-containing compounds or materials as well as ashless compounds or materials, or mixtures thereof. Metal-containing friction modifiers may include metal salts or metal-ligand complexes where the metals may include alkali, alkaline earth, or transition group metals. Such metal-containing friction modifiers may also have low-ash characteristics. Transition metals may include Mo, Sb, Sn, Fe, Cu, Zn, and others. Ligands may include hydrocarbyl derivative of alcohols, polyols, glycerols, partial ester glycerols, thiols, carboxylates, carbamates, thiocarbamates, dithiocarbamates, phosphates, thiophosphates, dithiophosphates, amides, imides, amines, thiazoles, thiadiazoles, dithiazoles, diazoles, triazoles, and other polar molecular functional groups containing effective amounts of O, N, S, or P, individually or in combination. In particular, Mo-containing compounds can be particularly effective such as for example Mo-dithiocarbamates, Mo(DTC), Mo-dithiophosphates, Mo(DTP), Mo-amines, Mo (Am), Mo-alcoholates, Mo-alcohol-amides, etc. See U.S. Pat. Nos. 5,824,627; 6,232,276; 6,153,564; 6,143,701; 6,110,878; 5,837,657; 6,010,987; 5,906,968; 6,734,150; 6,730,638; 6,689,725; 6,569,820; WO 99/66013; WO 99/47629; WO 98/26030.

Ashless friction modifiers may have also include lubricant materials that contain effective amounts of polar groups, for example, hydroxyl-containing hydrocarbyl base oils, glycerides, partial glycerides, glyceride derivatives, and the like. Polar groups in friction modifiers may include hydrocarbyl groups containing effective amounts of O, N, S, or P, individually or in combination. Other friction modifiers that may be particularly effective include, for example, salts (both ash-containing and ashless derivatives) of fatty acids, fatty alcohols, fatty amides, fatty esters, hydroxyl-containing carboxylates, and comparable synthetic long-chain hydrocarbyl acids, alcohols, amides, esters, hydroxy carboxylates, and the like. In some instances fatty organic acids, fatty amines, and sulfurized fatty acids may be used as suitable friction modifiers.

In certain embodiments, the friction modifier comprises at least one of a long chain alkyl thiocarbamide, mixed glyceride ester (substituted or unsubstituted), ethoxylated fatty ester, phenyl, or combination thereof. In certain embodiments, the friction modifier is selected from the group consisting of Molybdenum-containing friction modifier (Long chain alkyl thio carbamide molybdenum complex), Perfad 3336 (mono, di and/or trimester; mostly saturated $C_{14}$, $C_{16}$ & $C_{18}$), Perfad 3050 (ethoxylated fatty ester, an ester/ether block copolymer), and combinations thereof.

Useful concentrations of friction modifiers may range from about 0.01 wt % to about 10-15 wt % or more, often with a preferred range of about 0.1 wt % to about 5 wt %. Concentrations of molybdenum-containing materials are often described in terms of Mo metal concentration. Advantageous concentrations of Mo may range from about 10 ppm to 3000 ppm or more, and often with a preferred range of about 20-2000 ppm, and in some instances a more preferred range of about 30-1000 ppm. In certain additional embodiments, the concentrations of Mo may range from about 40 ppm to 500 ppm, from about 50-250 ppm, and in some instances a more preferred range of about 100-200 ppm. Friction modifiers of all types may be used alone or in mixtures with the materials of this disclosure. Often mixtures of two or more friction modifiers, or mixtures of friction modifier(s) with alternate surface active material(s), are also desirable. Organic friction modifier levels in the lubricating composition may range from about 0.01 weight percent to 15 weight percent, preferably from about 0.2 to 5 weight percent and more preferably from about 0.2 weight percent to 3 weight percent.

Antiwear and Extreme Pressure Additives

In certain embodiments the lubricating compositions described herein include antiwear and/or extreme pressure (EP) additives in order to provide adequate antiwear protection. Increasingly specifications for oil performance have exhibited a trend for improved antiwear properties of the oil. Antiwear and extreme EP additives perform this role by reducing friction and wear of metal parts.

While there are many different types of antiwear additives, for several decades the principal antiwear additive for internal combustion engine crankcase oils is a metal alkyl-thiophosphate and more particularly a metal dialkyldithio-phosphate in which the primary metal constituent is zinc, or zinc dialkyldithiophosphate (ZDDP). ZDDP compounds generally are of the formula $Zn[SP(S)(OR^1)(OR^2)]_2$ where $R^1$ and $R^2$ are $C_1$-$C_{18}$ alkyl groups, preferably $C_2$-$C_{12}$ alkyl groups. These alkyl groups may be straight chain or branched. The ZDDP is typically used in amounts of from about 0.4 to 1.4 wt % of the total lube oil composition, preferably from about 0.5 weight percent to about 1.0 weight percent, and more preferably from about 0.6 weight percent to about 0.8 weight percent, based on the total weight of the lubricating oil, although more or less can often be used advantageously.

For low phosphorus lubricating formulations, the phosphorus content is typically less than about 0.12 weight percent preferably less than about 0.10 weight percent and most preferably less than about 0.085 weight percent. Low phosphorus can be preferred in combination with friction modifiers.

In certain embodiments, the antiwear additive comprises at least one of a phenyl phosphorothionate, triphenyl phosphorothionate (TPPT), cresyl phosphates, tricresyl phosphate (TCP) or combination thereof.

The lubricating oil phosphorus content is typically in amounts of from about 300 ppm to 1400 ppm in the total lube oil composition, preferably from about 300 ppm to about 1200 ppm, and more preferably from about 300 ppm to about 800 ppm, based on the total composition of the lubricating oil, although more or less can often be used advantageously. Phosphorus-containing additives can be preferred in combination with friction modifiers. Often mixtures of antiwear additives in combination with friction modifiers, with alternate surface active material(s), are also desirable.

Exemplary antiwear/EP additives also include sulfurized olefins. Sulfur-containing olefins can be prepared by sulfurization or various organic materials including aliphatic, arylaliphatic or alicyclic olefinic hydrocarbons containing from about 3 to 30 carbon atoms, preferably 3-20 carbon atoms. The olefinic compounds contain at least one non-aromatic double bond. Such compounds are defined by the formula $R^3R^4C=CR^5R^6$ where each of $R^3$-$R^6$ are independently hydrogen or a hydrocarbon radical. Preferred hydrocarbon radicals are alkyl or alkenyl radicals. Any two of $R^3$-$R^6$ may be connected so as to form a cyclic ring. Additional information concerning sulfurized olefins and their preparation can be found in U.S. Pat. No. 4,941,984.

The use of polysulfides of thiophosphorus acids and thiophosphorus acid esters as lubricant additives is disclosed in U.S. Pat. Nos. 2,443,264; 2,471,115; 2,526,497; and 2,591,577. Addition of phosphorothionyl disulfides as an antiwear, antioxidant, and EP additive is disclosed in U.S. Pat. No. 3,770,854. Use of alkylthiocarbamoyl compounds (bis(dibutyl)thiocarbamoyl, for example) in combination with a molybdenum compound (oxymolybdenum diisopropyl-phosphorodithioate sulfide, for example) and a phosphorous ester (dibutyl hydrogen phosphite, for example) as antiwear additives in lubricants is disclosed in U.S. Pat. No. 4,501,678. U.S. Pat. No. 4,758,362 discloses use of a carbamate additive to provide improved antiwear and extreme pressure properties. The use of thiocarbamate as an antiwear additive is disclosed in U.S. Pat. No. 5,693,598. Thiocarbamate/molybdenum complexes such as moly-sulfur alkyl dithiocarbamate trimer complex (R=$C_8$-$C_{18}$ alkyl) are also useful antiwear agents. The use or addition of such materials should be kept to a minimum if the object is to produce low SAP formulations.

Esters of glycerol may be used as antiwear agents. For example, mono-, di, and tri-oleates, mono-palmitates and mono-myristates may be used.

ZDDP is combined with other compositions that provide antiwear properties. U.S. Pat. No. 5,034,141 discloses that a combination of a thiodixanthogen compound (octylthiodix-anthogen, for example) and a metal thiophosphate (ZDDP, for example) can improve antiwear properties. U.S. Pat. No. 5,034,142 discloses that use of a metal alkyoxyalkylxanthate (nickel ethoxyethylxanthate, for example) and a dixantho-gen (diethoxyethyl dixanthogen, for example) in combination with ZDDP improves antiwear properties.

Preferred antiwear additives include phosphorus and sulfur compounds such as zinc dithiophosphates and/or sulfur, nitrogen, boron, molybdenum phosphorodithioates, molybdenum dithiocarbamates and various organo-molybdenum derivatives including heterocyclics, for example dimercap-tothiadiazoles, mercaptobenzothiadiazoles, triazines, and the like, alicyclics, amines, alcohols, esters, diols, triols, fatty amides and the like can also be used. Such additives may be used in an amount of about 0.01 to 6 wt %, preferably about 0.01 to 4 wt %. ZDDP-like compounds provide limited hydroperoxide decomposition capability, significantly below that exhibited by compounds disclosed and claimed in this patent and can therefore be eliminated from the formulation or, if retained, kept at a minimal concentration to facilitate production of low SAP formulations.

Viscosity Index Improvers

Viscosity index improvers (also known as VI improvers, viscosity modifiers, and viscosity improvers) provide lubricants with high and low temperature operability. These additives impart shear stability at elevated temperatures and acceptable viscosity at low temperatures.

Suitable viscosity index improvers include high molecular weight hydrocarbons, polyesters and viscosity index improver dispersants that function as both a viscosity index improver and a dispersant. Typical molecular weights of these polymers are between about 10,000 to 1,000,000, more typically about 20,000 to 500,000, and even more typically between about 50,000 and 200,000.

Examples of suitable viscosity index improvers are polymers and copolymers of methacrylate, butadiene, olefins, polyacrylate esters, polymethacrylate esters and ethylene-propylene, butadiene-styrene copolymers and the like, or alkylated styrenes. Polyisobutylene is a commonly used viscosity index improver. Another suitable viscosity index improver is polymethacrylate (copolymers of various chain length alkyl methacrylates, for example), some formulations of which also serve as pour point depressants. Other suitable viscosity index improvers include copolymers of ethylene and propylene, hydrogenated block copolymers of styrene and isoprene, and polyacrylates (copolymers of various chain length acrylates, for example). Specific examples include styrene-isoprene or styrene-butadiene based polymers of 50,000 to 200,000 molecular weight.

Viscosity index improvers may be used in an amount of about 0 wt % to about 10 wt %, about 0 wt % to about 8 wt %, about 0 wt % to about 4 wt %, about 0 wt % to about 2 wt %, or about 0.01 to 4 wt % of total weight of lubricating oil composition.

Antioxidants

Antioxidants retard the oxidative degradation of base oils during service. Such degradation may result in deposits on metal surfaces, the presence of sludge, or a viscosity increase in the lubricant. One skilled in the art knows a wide variety of oxidation inhibitors that are useful in lubricating oil compositions. See, Klamann in Lubricants and Related Products, op cite, and U.S. Pat. Nos. 4,798,684 and 5,084,197, for example.

Typical anti-oxidant include phenolic anti-oxidants, aminic anti-oxidants and oil-soluble copper complexes. The phenolic antioxidants include sulfurized and non-sulfurized phenolic antioxidants. The terms "phenolic type" or "phenolic antioxidant" used herein includes compounds having one or more than one hydroxyl group bound to an aromatic ring which may itself be mononuclear, e.g., benzyl, or poly-nuclear, e.g., naphthyl and spiro aromatic compounds. Thus "phenol type" includes phenol per se, catechol, resorcinol, hydroquinone, naphthol, etc., as well as alkyl or alkenyl and sulfurized alkyl or alkenyl derivatives thereof, and bisphenol type compounds including such bi-phenol compounds linked by alkylene bridges sulfuric bridges or oxygen bridges. Alkyl phenols include mono- and poly-alkyl or alkenyl phenols, the alkyl or alkenyl group containing from about 3-100 carbons, preferably 4 to 50 carbons and sulfurized derivatives thereof, the number of alkyl or alkenyl groups present in the aromatic ring ranging from 1 to up to the available unsatisfied valences of the aromatic ring remaining after counting the number of hydroxyl groups bound to the aromatic ring.

Generally, therefore, the phenolic anti-oxidant may be represented by the general formula:

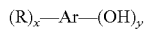

where Ar is selected from the group consisting of:

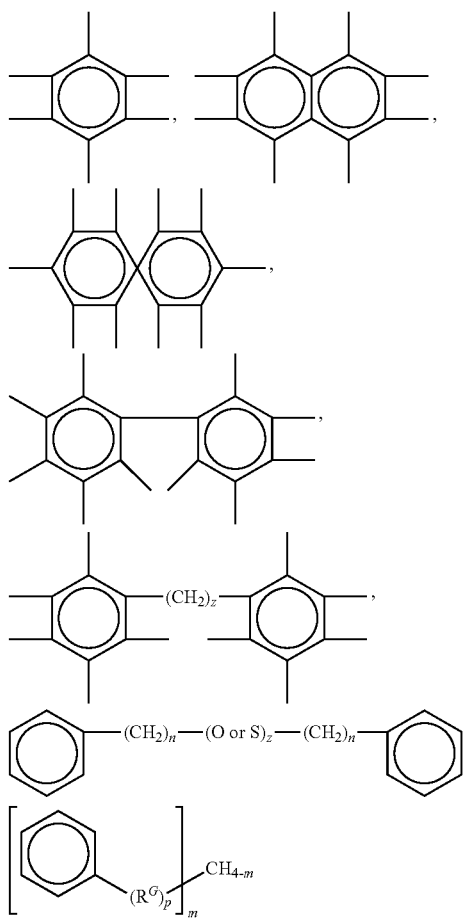

wherein R is a $C_3$-$C_{100}$ alkyl or alkenyl group, a sulfur substituted alkyl or alkenyl group, preferably a $C_4$-$C_{50}$ alkyl or alkenyl group or sulfur substituted alkyl or alkenyl group, more preferably $C_3$-$C_{100}$ alkyl or sulfur substituted alkyl group, most preferably a $C_4$-$C_{50}$ alkyl group, $R^G$ is a $C_1$-$C_{100}$ alkylene or sulfur substituted alkylene group, preferably a $C_2$-$C_{50}$ alkylene or sulfur substituted alkylene group, more preferably a $C_2$-$C_2$ alkylene or sulfur substituted alkylene group, y is at least 1 to up to the available valences of Ar, x ranges from 0 to up to the available valances of Ar-y, z ranges from 1 to 10, n ranges from 0 to 20, and m is 0 to 4 and p is 0 or 1, preferably y ranges from 1 to 3, x ranges from 0 to 3, z ranges from 1 to 4 and n ranges from 0 to 5, and p is 0.

Preferred phenolic anti-oxidant compounds are the hindered phenolics and phenolic esters which contain a sterically hindered hydroxyl group, and these include those derivatives of dihydroxy aryl compounds in which the hydroxyl groups are in the o- or p-position to each other.

Useful antioxidants include hindered phenols. These phenolic antioxidants may be ashless (metal-free) phenolic compounds or neutral or basic metal salts of certain phenolic compounds. Typical phenolic antioxidant compounds are the hindered phenolics which are the ones which contain a sterically hindered hydroxyl group, and these include those derivatives of dihydroxy aryl compounds in which the hydroxyl groups are in the o- or p-position to each other. Typical phenolic antioxidants include the hindered phenols substituted with $C_{6+}$ alkyl groups and the alkylene coupled derivatives of these hindered phenols. Examples of phenolic materials of this type 2-t-butyl-4-heptyl phenol; 2-t-butyl-4-octyl phenol; 2-t-butyl-4-dodecyl phenol; 2,6-di-t-butyl-4-heptyl phenol; 2,6-di-t-butyl-4-dodecyl phenol; 2-methyl-6-t-butyl-4-heptyl phenol; and 2-methyl-6-t-butyl-4-dodecyl phenol; 2-methyl-6-t-butyl-4-heptyl phenol; 2-methyl-6-t-butyl-4-dodecyl phenol; 2,6-di-t-butyl-4 methyl phenol; 2,6-di-t-butyl-4-ethyl phenol; and 2,6-di-t-butyl 4 alkoxy phenol; and

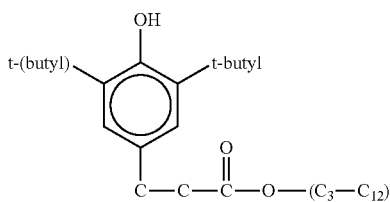

Other useful hindered mono-phenolic antioxidants may include for example hindered 2,6-di-alkyl-phenolic proprionic ester derivatives. Bis-phenolic antioxidants may also be advantageously used in combination with the instant disclosure. Examples of ortho-coupled phenols include: 2,2'-bis(4-heptyl-6-t-butyl-phenol); 2,2'-bis(4-octyl-6-t-butyl-phenol); and 2,2'-bis(4-dodecyl-6-t-butyl-phenol). Para-coupled bisphenols include for example 4,4'-bis(2,6-di-t-butyl phenol) and 4,4'-methylene-bis(2,6-di-t-butyl phenol).

Phenolic type anti-oxidants are well known in the lubricating industry and commercial examples such as Ethanox® 4710, Irganox® 1076, Irganox® L1035, Irganox® 1010, Irganox® L109, Irganox® L118, Irganox® L135 and the like are familiar to those skilled in the art. The above is presented only by way of exemplification, not limitation on the type of phenolic anti-oxidants which can be used.

The phenolic anti-oxidant can be employed in an amount in the range of about 0.1 to 3 wt %, preferably about 0.5 to 3 wt %, more preferably 0.5 to 2.5 wt % on an active ingredient basis. Non-phenolic oxidation inhibitors which may be used include aromatic amine antioxidants and these may be used either as such or in combination with phenolics. Typical examples of non-phenolic antioxidants include: alkylated and non-alkylated aromatic amines such as aromatic monoamines of the formula $R^8R^9R^{10}N$ where $R^8$ is an aliphatic, aromatic or substituted aromatic group, $R^9$ is an aromatic or a substituted aromatic group, and $R^{10}$ is H, alkyl, aryl or $R^{11}S(O)_xR^{12}$ where $R^{11}$ is an alkylene, alkenylene, or aralkylene group, $R^{12}$ is a higher alkyl group, or an alkenyl, aryl, or alkaryl group, and x is 0, 1 or 2. The aliphatic group $R^8$ may contain from 1 to about 20 carbon atoms, and preferably contains from about 6 to 12 carbon atoms. The aliphatic group is a saturated aliphatic group. Preferably, both $R^8$ and $R^9$ are aromatic or substituted aromatic groups, and the aromatic group may be a fused ring aromatic group such as naphthyl. Aromatic groups $R^8$ and $R^9$ may be joined together with other groups such as S.

Aromatic amine anti-oxidants include phenyl-a-naphthyl amine which is described by the following molecular structure:

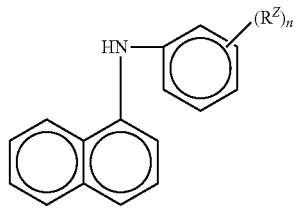

wherein $R^z$ is hydrogen or a $C_1$ to $C_{14}$ linear or $C_3$ to $C_{14}$ branched alkyl group, preferably $C_1$ to $C_{10}$ linear or $C_3$ to $C_{10}$ branched alkyl group, more preferably linear or branched $C_6$ to $C_8$ and n is an integer ranging from 1 to 5 preferably 1. A particular example is Irganox L06.

Other aromatic amine anti-oxidants include other alkylated and non-alkylated aromatic amines such as aromatic monoamines of the formula $R^8R^9R^{10}N$ where $R^8$ is an aliphatic, aromatic or substituted aromatic group, $R^9$ is an aromatic or a substituted aromatic group, and $R^{10}$ is H, alkyl, aryl or $R^{11}S(O)_xR^{12}$ where $R^{11}$ is an alkylene, alkenylene, or aralkylene group, $R^{12}$ is a higher alkyl group, or an alkenyl, aryl, or alkaryl group, and x is 0, 1 or 2. The aliphatic group $R^8$ may contain from 1 to about 20 carbon atoms, and preferably contains from about 6 to 12 carbon atoms. The aliphatic group is a saturated aliphatic group. Preferably, both $R^8$ and $R^9$ are aromatic or substituted aromatic groups, and the aromatic group may be a fused ring aromatic group such as naphthyl. Aromatic groups $R^8$ and $R^9$ may be joined together with other groups such as S.

Typical aromatic amines anti-oxidants have alkyl substituent groups of at least about 6 carbon atoms. Examples of aliphatic groups include hexyl, heptyl, octyl, nonyl, and decyl. Generally, the aliphatic groups will not contain more than about 14 carbon atoms. The general types of such other additional amine anti-oxidants which may be present include diphenylamines, phenothiazines, imidodibenzyls and diphenyl phenylene diamines. Mixtures of two or more of such other additional aromatic amines may also be present. Polymeric amine antioxidants can also be used.

Typical aromatic amines antioxidants have alkyl substituent groups on the aryl rings of at least about 6 carbon atoms. Examples of aliphatic groups include hexyl, heptyl, octyl, nonyl, and decyl. Generally, the aliphatic groups will not contain more than about 14 carbon atoms. The general types of amine antioxidants useful in the present compositions include diphenylamines, phenyl naphthylamines, phenothiazines, imidodibenzyls and diphenyl phenylene diamines. Mixtures of two or more aromatic amines are also useful. Polymeric amine antioxidants can also be used. Particular examples of aromatic amine antioxidants useful in the present disclosure include: p,p'-dioctyldiphenylamine; t-octylphenyl-alpha-naphthylamine; phenyl-alphanaphthylamine; and p-octylphenyl-alpha-naphthylamine.

Sulfurized alkyl phenols and alkali or alkaline earth metal salts thereof also are useful antioxidants.

Another class of antioxidant used in lubricating oil compositions is oil-soluble copper compounds. Any oil-soluble suitable copper compound may be blended into the lubricating oil. Examples of suitable copper antioxidants include copper dihydrocarbyl thio or dithio-phosphates and copper salts of carboxylic acid (naturally occurring or synthetic).

Other suitable copper salts include copper dithiacarbamates, sulphonates, phenates, and acetylacetonates. Basic, neutral, or acidic copper Cu(I) and or Cu(II) salts derived from alkenyl succinic acids or anhydrides are known to be particularly useful.

In certain embodiments, the antioxidant includes hindered phenols and arylamines.

Suitable antioxidants comprises of hindered phenols such as Irganox L 135, Irganox 1010 and alkylated diphenyl amines such as Naugalube 438L, Vanlube 81 or a mixture thereof.

Antioxidants may be used individually by type or in combination with one another. Such additives may be used in an amount of about 0.01 to 5 wt %, preferably about 0.01 to 1.5 wt %, more preferably zero to less than 1.5 wt %, most preferably zero to 1%.

Detergents

Detergents are commonly used in lubricating compositions. A typical detergent is an anionic material that contains a long chain hydrophobic portion of the molecule and a smaller anionic or oleophobic hydrophilic portion of the molecule. The anionic portion of the detergent is typically derived from an organic acid such as a sulfur acid, carboxylic acid, phosphorous acid, phenol, or mixtures thereof. The counterion is typically an alkaline earth or alkali metal.

Salts that contain a substantially stoichiometric amount of the metal are described as neutral salts and have a total base number (TBN, as measured by ASTM D2896) of from 0 to 80. Many compositions are overbased, containing large amounts of a metal base that is achieved by reacting an excess of a metal compound (a metal hydroxide or oxide, for example) with an acidic gas (such as carbon dioxide). Useful detergents can be neutral, mildly overbased, or highly overbased.

It is desirable for at least some detergent to be overbased. Overbased detergents help neutralize acidic impurities produced by the combustion process and become entrapped in the oil. Typically, the overbased material has a ratio of metallic ion to anionic portion of the detergent of about 1.05:1 to 50:1 on an equivalent basis. More preferably, the ratio is from about 4:1 to about 25:1. The resulting detergent is an overbased detergent that will typically have a TBN of about 150 or higher, often about 250 to 450 or more. Preferably, the overbasing cation is sodium, calcium, or magnesium. A mixture of detergents of differing TBN can be used in the present disclosure.

Preferred detergents include the alkali or alkaline earth metal salts of sulfonates, phenates, carboxylates, phosphates, and salicylates.

Sulfonates may be prepared from sulfonic acids that are typically obtained by sulfonation of alkyl substituted aromatic hydrocarbons. Hydro-carbon examples include those obtained by alkylating benzene, toluene, xylene, naphthalene, biphenyl and their halogenated derivatives (chlorobenzene, chlorotoluene, and chloronaphthalene, for example). The alkylating agents typically have about 3 to 70 carbon atoms. The alkaryl sulfonates typically contain about 9 to about 80 carbon or more carbon atoms, more typically from about 16 to 60 carbon atoms.

Klamann in "Lubricants and Related Products", discloses a number of overbased metal salts of various sulfonic acids which are useful as detergents and dispersants in lubricants. The book entitled "Lubricant Additives", C. V. Smallheer and R. K. Smith, published by the Lezius-Hiles Co. of Cleveland, Ohio (1967), similarly discloses a number of overbased sulfonates that are useful as dispersants/detergents.

Alkaline earth phenates are another useful class of detergent. These detergents can be made by reacting alkaline earth metal hydroxide or oxide (CaO, Ca(OH)$_2$, BaO, Ba(OH)$_2$, MgO, Mg(OH)$_2$, for example) with an alkyl phenol or sulfurized alkylphenol. Useful alkyl groups include straight chain or branched C$_1$-C$_{30}$ alkyl groups, preferably, C$_4$-C$_{20}$. Examples of suitable phenols include isobutylphenol, 2-ethylhexylphenol, nonylphenol, dodecyl phenol, and the like. It should be noted that starting alkylphenols may contain more than one alkyl substituent that are each independently straight chain or branched. When a non-sulfurized alkylphenol is used, the sulfurized product may be obtained by methods well known in the art. These methods include heating a mixture of alkylphenol and sulfurizing agent (including elemental sulfur, sulfur halides such as sulfur dichloride, and the like) and then reacting the sulfurized phenol with an alkaline earth metal base.

Metal salts of carboxylic acids are also useful as detergents. These carboxylic acid detergents may be prepared by reacting a basic metal compound with at least one carboxylic acid and removing free water from the reaction product. These compounds may be overbased to produce the desired TBN level. Detergents made from salicylic acid are one preferred class of detergents derived from carboxylic acids. Useful salicylates include long chain alkyl salicylates. One useful family of compositions is of the formula:

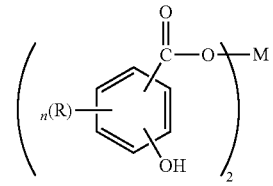

where R is a hydrogen atom or an alkyl group having 1 to about 30 carbon atoms, n is an integer from 1 to 4, and M is an alkaline earth metal. Preferred R groups are alkyl chains of at least C$_{11}$, preferably C$_{13}$ or greater. R may be optionally substituted with substituents that do not interfere with the detergent's function. M is preferably, calcium, magnesium, or barium. More preferably, M is calcium.

Hydrocarbyl-substituted salicylic acids may be prepared from phenols by the Kolbe reaction (see U.S. Pat. No. 3,595,791). The metal salts of the hydrocarbyl-substituted salicylic acids may be prepared by double decomposition of a metal salt in a polar solvent such as water or alcohol.

Alkaline earth metal phosphates are also used as detergents.

Detergents may be simple detergents or what is known as hybrid or complex detergents. The latter detergents can provide the properties of two detergents without the need to blend separate materials. See U.S. Pat. No. 6,034,039 for example.

Preferred detergents include calcium phenates, calcium sulfonates, calcium salicylates, magnesium phenates, magnesium sulfonates, magnesium salicylates and other related components (including borated detergents). Typically, the total detergent concentration is about 0.01 to about 10.0 wt %, preferably, about 0.1 to 0.4 wt %. In certain embodiments, the detergents can have total base number (TBN) ranging from neutral to highly overbased, i.e. TBN of 0 to over 500, preferably 2 to 400, more preferably 5 to 300, and they can be present either individually or in combination with each other in an amount in the range of from 0 to 10 wt %, preferably 0.5 to 5 wt % (active ingredient) based on the total weight of the formulated lubricating oil.

Dispersants

During engine operation, oil-insoluble oxidation byproducts are produced. Dispersants help keep these byproducts in solution, thus diminishing their deposition on metal surfaces. Dispersants may be ashless or ash-forming in nature. Preferably, the dispersant is ashless. So called ashless dispersants are organic materials that form substantially no ash upon combustion. For example, non-metal-containing or borated metal-free dispersants are considered ashless. In contrast, metal-containing detergents discussed above form ash upon combustion.

Suitable dispersants typically contain a polar group attached to a relatively high molecular weight hydrocarbon chain. The polar group typically contains at least one element of nitrogen, oxygen, or phosphorus. Typical hydrocarbon chains contain 50 to 400 carbon atoms.

Chemically, many dispersants may be characterized as phenates, sulfonates, sulfurized phenates, salicylates, naphthenates, stearates, carbamates, thiocarbamates, phosphorus derivatives. A particularly useful class of dispersants are the alkenylsuccinic derivatives, typically produced by the reaction of a long chain substituted alkenyl succinic compound, usually a substituted succinic anhydride, with a polyhydroxy or polyamino compound. The long chain group constituting the oleophilic portion of the molecule which confers solubility in the oil, is normally a polyisobutylene group. Many examples of this type of dispersant are well known commercially and in the literature. Exemplary U.S. patents describing such dispersants are U.S. Pat. Nos. 3,172,892; 3,2145,707; 3,219,666; 3,316,177; 3,341,542; 3,444,170; 3,454,607; 3,541,012; 3,630,904; 3,632,511; 3,787,374 and 4,234,435. Other types of dispersant are described in U.S. Pat. Nos. 3,036,003; 3,200,107; 3,254,025; 3,275,554; 3,438,757; 3,454,555; 3,565,804; 3,413,347; 3,697,574; 3,725,277; 3,725,480; 3,726,882; 4,454,059; 3,329,658; 3,449,250; 3,519,565; 3,666,730; 3,687,849; 3,702,300; 4,100,082; 5,705,458. A further description of dispersants may be found, for example, in European Patent Application No. 471 071, to which reference is made for this purpose.

Hydrocarbyl-substituted succinic acid compounds are popular dispersants. In particular, succinimide, succinate esters, or succinate ester amides prepared by the reaction of a hydrocarbon-substituted succinic acid compound preferably having at least 50 carbon atoms in the hydrocarbon substituent, with at least one equivalent of an alkylene amine are particularly useful.

Succinimides are formed by the condensation reaction between alkenyl succinic anhydrides and amines. Molar ratios can vary depending on the poly-amine. For example, the molar ratio of alkenyl succinic anhydride to TEPA (tetraethylenepentamine) can vary from about 1:1 to about 5:1. Representative examples are shown in U.S. Pat. Nos. 3,087,936; 3,172,892; 3,219,666; 3,272,746; 3,322,670; and U.S. Pat. Nos. 3,652,616, 3,948,800; and Canada Pat. No. 1,094,044.

Succinate esters are formed by the condensation reaction between alkenyl succinic anhydrides and alcohols or polyols. Molar ratios can vary depending on the alcohol or polyol used. For example, the condensation product of an alkenyl succinic anhydride and pentaerythritol is a useful dispersant.

Succinate ester amides are formed by condensation reaction between alkenyl succinic anhydrides and alkanol amines. For example, suitable alkanol amines include ethoxylated polyalkylpolyamines, propoxylated polyalkylpolyamines and polyalkenylpolyamines such as polyethylene polyamines. One example is propoxylated hexamethylenediamine. Representative examples are shown in U.S. Pat. No. 4,426,305.

The molecular weight of the alkenyl succinic anhydrides used in the preceding paragraphs will typically range between 800 and 2,500. The above products can be post-reacted with various reagents such as sulfur, oxygen, formaldehyde, carboxylic acids such as oleic acid, and boron compounds such as borate esters or highly borated dispersants. The dispersants can be borated with from about 0.1 to about 5 moles of boron per mole of dispersant reaction product.

Mannich base dispersants are made from the reaction of alkylphenols, formaldehyde, and amines. See U.S. Pat. No. 4,767,551, which is incorporated herein by reference. Process aids and catalysts, such as oleic acid and sulfonic acids, can also be part of the reaction mixture. Molecular weights of the alkylphenols range from 800 to 2,500. Representative examples are shown in U.S. Pat. Nos. 3,697,574; 3,703,536; 3,704,308; 3,751,365; 3,756,953; 3,798,165; and 3,803,039.

Typical high molecular weight aliphatic acid modified Mannich condensation products useful in this disclosure can be prepared from high molecular weight alkyl-substituted hydroxyaromatics or $HN(R)_2$ group-containing reactants.

Examples of high molecular weight alkyl-substituted hydroxyaromatic compounds are polypropylphenol, polybutylphenol, and other polyalkylphenols. These polyalkylphenols can be obtained by the alkylation, in the presence of an alkylating catalyst, such as $BF_3$, of phenol with high molecular weight polypropylene, polybutylene, and other polyalkylene compounds to give alkyl substituents on the benzene ring of phenol having an average 600-100,000 molecular weight.

Examples of $HN(R)_2$ group-containing reactants are alkylene poly-amines, principally polyethylene polyamines. Other representative organic compounds containing at least one $HN(R)_2$ group suitable for use in the preparation of Mannich condensation products are well known and include the mono- and di-amino alkanes and their substituted analogs, e.g., ethylamine and diethanol amine; aromatic diamines, e.g., phenylene diamine, diamino naphthalenes; heterocyclic amines, e.g., morpholine, pyrrole, pyrrolidine, imidazole, imidazolidine, and piperidine; melamine and their substituted analogs.

Examples of alkylene polyamide reactants include ethylenediamine, diethylene triamine, triethylene tetraamine, tetraethylene pentaamine, pentaethylene hexamine, hexaethylene heptaamine, heptaethylene octaamine, octaethylene nonaamine, nonaethylene decamine, and decaethylene undecamine and mixture of such amines having nitrogen contents corresponding to the alkylene polyamines, in the formula $H_2N-(Z-NH-)_nH$, mentioned before, Z is a divalent ethylene and n is 1 to 10 of the foregoing formula. Corresponding propylene polyamines such as propylene diamine and di-, tri-, tetra-, pentapropylene tri-, tetra-, penta- and hexaamines are also suitable reactants. The alkylene polyamines are usually obtained by the reaction of ammonia and dihalo alkanes, such as dichloro alkanes. Thus the alkylene polyamines obtained from the reaction of 2 to 11 moles of ammonia with 1 to 10 moles of dichloroalkanes having 2 to 6 carbon atoms and the chlorines on different carbons are suitable alkylene polyamine reactants.

Aldehyde reactants useful in the preparation of the high molecular products useful in this disclosure include the aliphatic aldehydes such as formaldehyde (also as paraformaldehyde and formalin), acetaldehyde and aldol (.beta.- hydroxybutyraldehyde). Formaldehyde or a formaldehyde-yielding reactant is preferred.

Hydrocarbyl substituted amine ashless dispersant additives are well known to one skilled in the art; see, for example, U.S. Pat. Nos. 3,275,554; 3,438,757; 3,565,804; 3,755,433, 3,822,209, and 5,084,197.

Preferred dispersants include borated and non-borated succinimides, including those derivatives from mono-succinimides, bis-succinimides, and/or mixtures of mono- and bis-succinimides, wherein the hydrocarbyl succinimide is derived from a hydrocarbylene group such as polyisobutylene having a Mn of from about 500 to about 5000 or a mixture of such hydrocarbylene groups. Other preferred dispersants include succinic acid-esters and amides, alkyl-phenol-polyamine-coupled Mannich adducts, their capped derivatives, and other related components. Such additives may be used in an amount of about 0.1 to 20 wt %, preferably about 0.1 to 8 wt %.

Pour Point Depressants

Conventional pour point depressants (also known as lube oil flow improvers) may be added to the compositions of the present disclosure if desired. These pour point depressant may be added to lubricating compositions of the present disclosure to lower the minimum temperature at which the fluid will flow or can be poured. Examples of suitable pour point depressants include poly-methacrylates, polyacrylates, polyarylamides, condensation products of haloparaffin waxes and aromatic compounds, vinyl carboxylate polymers, and terpolymers of dialkylfumarates, vinyl esters of fatty acids and allyl vinyl ethers, alkyl fumarate-vinyl acetate copolymers such as Infineum V385 and Infineum V387. U.S. Pat. Nos. 1,815,022; 2,015,748; 2,191,498; 2,387,501; 2,655, 479; 2,666,746; 2,721,877; 2,721,878; and 3,250,715 describe useful pour point depressants and/or the preparation thereof. Such additives may be used in an amount of about 0.01 to 5 wt %, or about 0.01 to 1.5 wt %. In certain embodiments, the amount of pour point depressants range from about 0.1 to about 1.0 wt % of the total weight of lubricant composition.

Seal Compatibility Additives

Seal compatibility agents help to swell elastomeric seals by causing a chemical reaction in the fluid or physical change in the elastomer. Suitable seal compatibility agents for lubricating oils include organic phosphates, aromatic esters, aromatic hydrocarbons, esters (butylbenzyl phthalate, for example), and polybutenyl succinic anhydride. Such additives may be used in an amount of about 0.01 to 3 wt %, preferably about 0.01 to 2 wt %, more preferably about 0.1 to 1 wt %.

Anti-Foam Agents

Anti-foam agents may advantageously be added to lubricant compositions. These agents retard the formation of stable foams. Silicones and organic polymers are typical anti-foam agents. For example, polysiloxanes, such as silicon oil or polydimethyl siloxane, provide antifoam properties. Anti-foam agents are commercially available and may be used in conventional minor amounts along with other additives such as demulsifiers; usually the amount of these additives combined is less than 1 percent by weight and often less than 0.1 percent by weight.

Corrosion Inhibitors

Corrosion inhibitors which are necessary components of the present disclosure can be described as any materials (additives, functionalized fluids, etc.) that form a protective film on a surface that prevents corrosion agents from reacting or attacking that surface with a resulting loss of surface material. Protective films may be absorbed on the surface or chemically bonded to the surface. Protective films may be constituted from mono-molecular species, oligomeric species, polymeric species, or mixtures thereof. Protective films may derive from the intact corrosion inhibitors, from their combination products, or their degradation products, or mixtures thereof. Surfaces that may benefit from the action of corrosion inhibitors may include metals and their alloys (both ferrous and non-ferrous types) and non-metals. Corrosion inhibitors used to protect metals may also be called metal passivators or metal deactivators. Corrosion inhibitors may include rust inhibitors, which are particularly useful for the protection of ferrous metals and their alloys. Selected corrosion inhibitors may be particularly useful in protecting non-ferrous metals, for example copper and its alloys.

Corrosion inhibitors may include various oxygen-, nitrogen-, sulfur-, and phosphorus-containing materials, and may include metal-containing compounds (salts, organometallics, etc.) and nonmetal-containing or ashless materials. Corrosion inhibitors may include, but are not limited to, additive types such as, for example, hydrocarbyl-, aryl-, alkyl-, arylalkyl-, and alkylaryl-versions of detergents (neutral, overbased), sulfonates, phenates, salicylates, alcoholates, carboxylates, salixarates, phosphites, phosphates, thiophosphates, amines, amine salts, amine phosphoric acid salts, amine sulfonic acid salts, alkoxylated amines, etheramines, polyetheramines, amides, imides, azoles, diazoles, triazoles, benzotriazoles, benzothiadoles, mercaptobenzothiazoles, tolyltriazoles (TTZ-type), heterocyclic amines, heterocyclic sulfides, thiazoles, thiadiazoles, mercaptothiadiazoles, dimercaptothiadiazoles (DMTD-type), imidazoles, benzimidazoles, dithiobenzimidazoles, imidazolines, oxazolines, Mannich reactions products, saligenin derivatives, glycidyl ethers, anhydrides, carbamates, thiocarbamates, dithiocarbamates, polyglycols, etc., or mixtures thereof.

Corrosion agents may derive from many sources, for example from one or more components (additives and/or base stocks) within a finished lubricant composition, from degradation products accumulated in a lubricant fluid during lubricant service, from outside contaminants accumulated in a lubricant fluid during lubricant service, and so forth. Corrosion agents may include, but are not limited to, for example thiols, mercaptans, sulfides, di-, tri-, polysulfides, mineral acids, hydrocarbon acids, carboxylic acids, nitrogen-derived acids, sulfur-derived acids, phosphorus-derived acids, oxidized and/or nitrated hydrocarbons, oxidized and/or nitrated lube products, fuel combustion products, lubricating fluid contaminants, oxidized and/or nitrated soots, etc.

Corrosion inhibitors are used to reduce the degradation of metallic parts that are in contact with the lubricating oil composition. Suitable corrosion inhibitors include thiadiazoles. See, for example, U.S. Pat. Nos. 2,179,125; 2,719,126; and 3,087,932. Aromatic triazoles, such as toly triazole, are suitable corrosion inhibitors for non-ferrous metals, such as copper.

Other metal corrosion inhibitors include thiadiazoles, e.g., dialkyl dimercapto thiadiazoles, triazoles, e.g., benzotriazole, toluoyltriazole. Such anti-corrosion materials are commonly incorporated into oils in an amount in the range of about 0.01 to 5.0 wt %, preferably about 0.01 to 1.5 wt %, more commonly, especially in the case of the surface active corrosion inhibitors, in an amount in the range of about 0.01 to 1.0 wt %.

Corrosion inhibitor additives may be used in an amount of about 0.001 to 5 wt %, preferably about 0.01 to 1.5 wt %, more preferably about 0.15 to 1.0 wt %, still more preferably about 0.2 to 0.6 wt %, even more preferably about 0.2 to 0.5 wt %, most preferably about 0.3 to 0.5 wt % active ingredient, relative to the weight of the total lubricant composition. When the formulations in which the corrosion inhibitor additives are used also contain corrosive anti-wear additives or other corrosive additives, the corrosive additives and corrosion inhibitors are present at a corrosive additive to corrosion inhibitor weight ratio of about 45:1 to 1:1, preferably 30:1 to 1:1, more preferably 15:1 to 1:1, still more preferably about 15:1 to 3:1, even more preferably about 15:2 to 3:1.

Corrosion inhibitors useful in this disclosure include benzotraizole, and tolyltriazoles such as Cobratec TT-100. In the aviation piston engine oil embodiment of the present disclosure, the preferred amount of corrosion inhibitors ranges from about 0.05 to about 0.2 wt % of the total weight of lubricating oil composition.

Anti-Rust Additives

Anti-rust additives (corrosion inhibitors) protect the metal surfaces by preventing attack of the metal surfaces by water or other contaminants. Some anti-rust additives are polar compounds that wet the metal surface preferentially, protecting the metal surface with a hydrocarbonaceous-type or oil-type film. Other anti-rust/anti-corrosion additives absorb water by incorporating it into a water-in-oil emulsion so that only the continuous oil phase is in contact with the metal surface. Yet other anti-rust additives chemically adhere to the metal to produce a non-reactive surface. Suitable additives include zinc dithiophosphates, metal phenolates, basic metal sulfonates, fatty acids, amines.

Examples of suitable additives include zinc dithiophosphates, metal phenolates, basic metal sulfonates, fatty acids and amines. Such additives may be used in an amount of about 0.01 to 5 wt %, preferably about 0.01 to 1.5 wt % on an as-received basis.

In addition to the ZDDP anti-wear additives which are essential components of the present disclosure, other anti-wear additives can be present, including zinc dithiocarbamates, molybdenum dialkyldithiophosphates, molybdenum dithiocarbamates, other organo molybdenum-nitrogen complexes, sulfurized olefins, etc.

The term "organo molybdenum-nitrogen complexes" embraces the organo molybdenum-nitrogen complexes described in U.S. Pat. No. 4,889,647. The complexes are reaction products of a fatty oil, dithanolamine and a molybdenum source. Specific chemical structures have not been assigned to the complexes. U.S. Pat. No. 4,889,647 reports an infrared spectrum for a typical reaction product of that disclosure; the spectrum identifies an ester carbonyl band at 1740 cm$^{-1}$ and an amide carbonyl band at 1620 cm$^{-1}$. The fatty oils are glyceryl esters of higher fatty acids containing at least 12 carbon atoms up to 22 carbon atoms or more. The molybdenum source is an oxygen-containing compound such as ammonium molybdates, molybdenum oxides and mixtures.

Other organo molybdenum complexes which can be used in the present disclosure are tri-nuclear molybdenum-sulfur compounds described in EP 1 040 115 and WO 99/31113 and the molybdenum complexes described in U.S. Pat. No. 4,978,464.

An extreme pressure agent useful in this disclosure comprises dialkyl dimercapto thiadiazoles such as Hitec 4313. The amount of extreme pressure agents range from about 0.1 to about 0.5 wt % of total weight of lubricating oil composition.

In certain additional embodiments, the lubricant composition comprises from about 0 ppm to about 4000 ppm of metals and/or metalloids. In certain additional embodiments, the lubricant composition comprises from about 0.1 ppm to about 4000 ppm of metals and/or metalloids. In certain additional embodiments, the lubricant composition comprises from about 1 ppm to about 3500 ppm of metals and/or metalloids. In certain additional embodiments, the lubricant composition comprises from about 10 ppm to about 3500 ppm of metals and/or metalloids.

In certain embodiments, the lubricant composition comprises at least one of from about 0.01 ppm to about 2000 ppm of Mo, from about 0.01 ppm to about 2000 ppm of P, from about 0.01 ppm to about 2000 ppm of Zn, or a combination thereof. In certain embodiments, the lubricant composition comprises at least one of from about 0.1 ppm to about 200 ppm of Mo, from about 1 ppm to about 1600 ppm of P, from about 0.1 ppm to about 1800 ppm of Zn, or a combination thereof.

In certain embodiments, the lubricant composition comprises 0.1, 0.2, 0.3, 0.4, 0.5, 0.6, 0.7, 0.8, 0.9, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 40, 50, 60, 70, 80, 90, 100, 110, 120, 130, 140, 150, 160, 170, 180, 190, 200, 21, 22, 230, 240, 250, 260, 270, 280, 290, 300, 400, 500, 600, 700, 800, 900, 1000, 1200, 1400, 1600, 1800, 2000 ppm (and including all values in between) of a metal and/or metalloid. In certain embodiments, the metal or metalloid is at least one of Al, Ba, Bi, Ca, Cd, Co, Cr, Cu, Fe, K, Li, Mg, Mo, Na, Ni, P, Si, Sn, Ti, W, Zn, Zr, Y, rare earth metal, or a combination thereof.

In certain embodiments, the lubricant compositions as described herein comprise one or more metals or metalloids each present in an amount (part per million) of 0.1, 0.2, 0.3, 0.4, 0.5, 0.6, 0.7, 0.8, 0.9, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 40, 50, 60, 70, 80, 90, 100, 110, 120, 130, 140, 150, 160, 170, 180, 190, 200, 21, 22, 230, 240, 250, 260, 270, 280, 290, 300, 400, 500, 600, 700, 800, 900, 1000, 1200, 1400, 1600, 1800, 2000 ppm (and including all values in between).

In any of the aspects or embodiments, the friction modifier comprises an effective metal. In certain embodiments, the metal-containing friction modifier comprises less than about 90%, 80%, 70%, 60%, 50%, 40%, 30%, 20%, 10%, 5%, 1%, 0.5%, 0.1%, 0.05%, 0.01% or 0.005% by weight of an effective metal.

In certain embodiments, the organic friction modifier comprises at least one member selected from the group consisting of glycerol monooleate, alkoxylated alcohol, stearyl ether, fatty acid-based ester, fatty acid-based amide, salicylate, polymeric ester, and a combination thereof.

In an additional aspect, the description provides a composition comprising an AM component, article or material and a lubricant composition as described herein. In certain embodiments, the description provides a machine, device or system comprising an AM component, article or material, and the lubricant composition as described herein. In certain embodiments, the description provides a machine, device or system comprising an additive manufactured, e.g., 3D printed, component, article or material and an effective amount of a lubricant composition as described herein, wherein the lubricant composition improves friction wear or other lubricant performance in the machine, device or system. In certain embodiments, the machine, device or system comprises a plurality of components, articles or materials that are additive manufactured.

In certain embodiments, the machine, device or system includes an internal combustion engine, power train, driveline, transmission, gear, gear train, gear set, compressor, pump, hydraulic system, bearing, bushing, turbine, mechanical device, electro-mechanical device, electrical device, hydraulic device, hybrid device, piston, piston ring, cylinder liner, cylinder, cam, tappet, lifter, bearing (journal, roller, tapered, needle, ball, and the like), valve or a combination thereof.

In certain embodiments, the article or material is an engine, e.g., combustion engine, or component thereof. In certain additional embodiments, the non-surface finished or AM component, article or material is at least one of a disc, gear, steering rack component, transmission component, fuel injector component, camshaft lobe, hydraulic cylinder rod, bearing, bearing race, needle roller, sharpening stone, wheel or a combination thereof. In certain additional embodiments, the component is a biomedical component such as a joint, socket, brace, plate, pin, support, stent, or the like.

Methods

Roughness is a good predictor of the performance of a mechanical component, since irregularities in the surface may form nucleation sites for cracks or corrosion. Although a high roughness value is often undesirable, it can be difficult and expensive to control in manufacturing. Decreasing the roughness of a surface will usually increase its manufacturing costs. This often results in a trade-off between the manufacturing cost of a component and its performance in application.

Surface roughness can be measured by methods well-known in the art, including manual comparison via microscope, e.g., high-power microscopy. In general, the roughness of a material is compared against a "surface roughness comparator," a sample of known surface roughnesses. Surface profile measurement can also be made with a profilometer that can be contact (typically a diamond stylus) or optical (e.g. a white light interferometer). As would be appreciated by those of skill in the art, an unfinished or "rough" surface typically has roughness of greater than about 100 nm. For example, the surfaces of 3D printed materials have a roughness of from 20-40 µm. The lubricant compositions as described herein are surprisingly useful with components that have not been surface finished (i.e., are "rough").

Thus, in one aspect, the description provides a method of improving friction, wear, and other lubricant performances of an additive manufactured article or material, or machine, device or system including the same, the method comprising the steps of providing an additive manufactured article or a machine, device or system comprising the same, wherein the additive manufactured article has not undergone traditional surface finishing, and adding a lubricant composition as described herein to the machine, device or system, wherein the lubricant composition improves friction wear or other lubricant performance.

In an additional aspect, the description provides a method of reducing the surface roughness of an article or material, such as, for example, an additive manufactured (AM) article or material, comprising the steps of providing a lubricant composition as described herein, and providing an article or material having a rough surface, applying the lubricant composition to the article or material; and introducing or applying a load, e.g., a frictional force, to the article or material, wherein the lubricant composition reduces the surface roughness of the article or material resulting in a reduction in surface roughness. In certain embodiments, the AM article or material is a 3D printed article or material.

In an additional aspect, the description provides a method of reducing the surface roughness of an article or material, such as, for example, a 3D printed article or material, comprising the steps of providing a lubricant composition as described herein, and providing an article or material having a rough surface, first surface roughness ($Ra_1$), applying the lubricant composition to the article or material; and introducing or applying a frictional force to the article or material, wherein the lubricant composition reduces the surface roughness of the article or material resulting in a second surface roughness ($Ra_2$) that is less than the first surface roughness.

In certain additional embodiments, the initial or first surface roughness ($Ra_1$) is reduced by at least 1%, 2%, 3%, 4%, 5%, 6%, 7%, 8%, 9%, 10% or more (and including all values in between). In further embodiments, the initial or first surface roughness is reduced by at least 10%, 20%, 30%, 40%, 50%, 60%, 70%, 80%, 90% or more (and including all values in between).

In certain embodiments, the material has an initial or first surface roughness ($Ra_1$) of at least 1 mm, 100 µm, 10 µm, 9 µm, 8 µm, 7 µm, 6 µm, 5 µm, 4 µm, 3 µm, 2 µm, 1 µm, 0.5 µm, 0.3 µm, 0.2 µm or 0.1 m (and including all values in between).

In certain embodiments, the resulting (i.e., final) or second surface roughness ($Ra_2$) is less than or equal to about 8 µm, 7 µm, 6 µm, 5 µm, 4 µm, 3 µm, 2 µm, 1 µm, 0.5 µm, 0.3 µm, 0.2 m or 0.1 µm, 0.05 µm, 0.03 µm, 0.02 µm, or 0.01 m (and including all values in between).

In certain embodiments, the material comprises at least one of a polymer, coating, non-metallic material, metalloid, metal, an alloy, cermet, ceramic, or a combination thereof. In additional embodiments, the alloy comprises a member selected from the group consisting of austenitic stainless steels, duplex steels, tool steels (& maraging steels), low alloy steels, cobalt alloys, nickel alloys, copper alloys, bismuth alloys, titanium alloys, rare earth element type alloys, MCrAlY alloys, aluminum alloys, tin alloys, bronze alloys, and combinations thereof.

The lubrication conditions used to reduce the surface roughness of an AM material may be applied in any desired manner. In certain exemplary embodiments, the lubrication is applied under conditions of from about 0.5 MPa to about 2 GPa pressure, from about 20° C. to about 200° C. or greater, a mean speed of from about 5 mm/s to about 5000 mm/s or greater, and slide-to-roll ratio (SRR) of from about 5% to about 100% or greater, of from 150% to about 250% or greater, and may encompass 100% sliding. In certain embodiments, the load is greater than 1 MPa, preferably greater than 50 MPa, more preferably greater than 100 MPa, even more preferably greater than 500 MPa, and under some circumstances, greater than 1 GPa, preferably greater than 2 GPa. In certain embodiments, the frictional force is applied at 1.0 GPa pressure. In certain embodiments, the temperature is greater than 20° C., preferably greater than 50° C., more preferably greater than 100° C., even more preferably greater than 150° C., and under some circumstances greater than 200° C., preferably greater than 250° C. In some embodiments, the frictional force is applied at a temperature of 140° C. In certain embodiments, the mean sliding speed is greater than 5 mm/s, preferably greater than 50 mm/s, more preferably greater than 100 mm/s, even more preferably greater than 500 mm/s, and under some circumstances, greater than 1000 mm/s, preferably greater than 2000 mm/s, even more preferably greater than 3000 mm/s. In additional embodiments, the frictional force is applied at a mean speed of 100 mm/s. In certain embodiments, the sliding is greater than 5% slide-to-roll ratio, preferably greater than 50% slide-to-roll ratio, more preferably greater than 100% slide-to-roll ratio, even more preferably greater than 200% slide-to-roll ratio, and under some circumstances, greater than 500% slide-to-roll ratio, and preferably up to 100% sliding.

In an additional aspect, the description provides methods of making the lubricant formulations as described herein. For example, in certain embodiments the formulations are prepared by normal blending or blending from concentrates. When lubricating oil compositions contain one or more of the additives discussed above, the additive(s) are blended into the composition in an amount sufficient for it to perform its intended function. The wt % indicated below are based on the total weight of the lubricating oil composition.

Thus, in another aspect, the description provides a method of improving friction, wear, and other lubricant performances of a machine, device or system including an additive manufactured article (which has not been surface finished) comprising adding the lubricant composition as described herein to the machine, device or system, wherein the lubricant composition improves friction wear or other lubricant performance, e.g., surface roughness.

As would be appreciated by those of skill in the art, the methods as described herein are also suitable for the use with components of mechanical systems of any known type. Exemplary mechanical systems include combustion or compression engines of any type, biomedical apparatuses, computer components, or the like.

In an embodiment, the instant disclosure gives advantaged performance in the lubrication of internal combustion engines, power trains, drivelines, transmissions, gears, gear trains, gear sets, compressors, pumps, hydraulic systems, bearings, bushings, turbines, and the like.

Lubricant performance of the instant disclosure encompasses one or more of the performance attributes among the group listed as follows: friction control, wear control, thermal stability oxidative stability, cleanliness, deposit control, thermal conductivity, heat transfer, solvency, miscibility, temperature control, wetting, wettability, foaming, defoaming, materials compatibility (where materials comprise elastomers, plastics, thermoplastics, metals, non-metals, ceramics, cermets, glasses, diamond-like carbons, composites, combinations of such materials, and the like), combinations of such attributes and the like.

In an embodiment, the instant disclosure may perform advantageously in diverse systems, for example, mechanical, electro-mechanical, electrical, hydraulic, hybrid and the like.

In an embodiment, the instant disclosure gives advantaged friction, wear, and other lubricant performances in the lubrication of mechanical components, which comprise, for example, pistons, piston rings, cylinder liners, cylinders, cams, tappets, lifters, bearings (journal, roller, tapered, needle, ball, and the like), gears, valves, and the like.

In an embodiment, the instant disclosure gives advantaged performance with lubricant compositions comprising lubricating liquids, semi-solids, solids, greases, dispersions, suspensions, material concentrates, additive concentrates, and the like.

In an embodiment, the instant disclosure is useful when the lubricant composition is an additive concentrate comprising the combination of at least one basestock and at least one additive component, having combined additive weight percent concentrations in the range of 1% to 80%, preferably 2% to 60%, more preferably 3% to 50%, even more preferably 4% to 40%, and in some instances preferably 5% to 30%.

In an embodiment, the instant disclosure gives advantaged friction, wear, and other lubricant performances under diverse lubrication regimes, comprising for example hydrodynamic, elastohydrodynamic, boundary, mixed lubrication, and extreme pressure regimes.

In an embodiment, the instant disclosure gives advantaged friction, wear, and other lubricant performances under a range of lubrication contact pressures, from less than or equal to 1 MPas to greater than 10 GPas, preferably greater than 10 MPas, more preferably greater than 100 MPas, even more preferable greater than 300 MPas. Under certain circumstances, the instant disclosure gives advantaged wear and friction performance at greater than 0.5 GPas, often at greater than 1 GPas, sometimes greater than 2 GPas, under selected circumstances greater than 5 GPas.

In an embodiment, the instant disclosure gives advantaged friction, wear, and other lubricant performances when used in combination with spark-ignition internal combustion engines, compression-ignition internal combustion engines, mixed-ignition (spark-assisted and compression) internal combustion engines, jet- or plasma-ignition internal combustion engines.

In an embodiment, the instant disclosure gives advantaged friction, wear, and other lubricant performances when used in combination with diverse engine types, which may comprise: 2-stroke engines; 4-stroke engine; engines with alternate stroke designs greater than 2-stroke, such as 5-stroke, or 7-stroke, and the like; rotary engines; dedicated EGR (exhaust gas recirculation) fueled engines; free-piston engines; opposable-piston opposable-cylinder engines; engines that function in hybrid propulsion systems, which may further comprise electrical-based power systems, hydraulic-based power systems, diverse system designs such as parallel, series, non-parallel, and the like.

In an embodiment, the instant disclosure gives advantaged friction, wear, and other lubricant performances used in combination with: naturally aspirated engines; turbocharged and supercharged, port-fueled injection engines; turbocharged and supercharged, direct injection engines (for gasoline, diesel, natural gas, and other fuel types); turbocharged engines designed to operate with in-cylinder combustion pressures of greater than 12 bar, preferably greater than 18 bar, more preferably greater than 20 bar, even more preferably greater than 22 bar, and in certain instances combustion pressures greater than 24 bar, even greater than 26 bar, and even more so greater than 28 bar, and with particular designs greater than 30 bar; engines having low-temperature burn combustion, lean-burn combustion, and high thermal efficiency designs.

In an embodiment, a lubricant composition of the instant disclosure gives advantaged friction, wear, and other lubricant performances when used in combination with engines that are fueled with fuel compositions comprising: gasoline; distillate fuel, diesel fuel, jet fuel, gas-to-liquid and Fischer-Tropsch-derived fuels, high-cetane fuels; compressed natural gas, liquefied natural gas, methane, ethane, propane, other natural gas components, other natural gas liquids; ethanol, methanol, other higher MW alcohols; FAMEs, vegetable-derived esters and polyesters; biodiesel, bio-derived and bio-based fuels; hydrogen; dimethyl ether; other alternate fuels; fuels diluted with EGR (exhaust gas recirculation) gases, with EGR gases enriched in hydrogen or carbon monoxide or combinations of $H_2/CO$, in both dilute and high concentration (in concentrations of >0.1%, preferably >0.5%, more preferably >1%, even more preferably >2%, and even more so preferably >3%), and blends or combinations of these in proportions that enhance combustion efficiency, power, cleanliness, anti-knock, and anti-LSPI (low speed pre-ignition).

In an embodiment, a lubricant composition of the instant disclosure gives advantaged friction, wear, and other lubricant performances when used in a lubricated contact consisting of two surfaces separated by said lubricant composition, where at least one of the lubricated surfaces comprises at least one of: metals, metal alloys, non-metals, non-metal alloys, mixed carbon-metal composites and alloys, mixed carbon-nonmetal composites and alloys, ferrous metals, ferrous composites and alloys, non-ferrous metals, non-ferrous composites and alloys, titanium, titanium composites and alloys, aluminum, aluminum composites and alloys, magnesium, magnesium composites and alloys, ion-implanted metals and alloys, plasma modified surfaces; surface modified materials; coatings; mono-layer, multi-layer, and gradient layered coatings; honed surfaces; polished surfaces; etched surfaces; textured surfaces; micro and nano structures on textured surfaces; super-finished surfaces; diamond-like carbon (DLC), DLC with high-hydrogen content, DLC with moderate hydrogen content, DLC with low-hydrogen content, DLC with zero hydrogen content, DLC composites, DLC-metal compositions and composites, DLC-nonmetal compositions and composites; glasses, metallic glasses; ceramics, cermets, ceramic oxides, ceramic nitrides, FeN, CrN, ceramic carbides, mixed ceramic compositions, and the like; polymers, plastics, thermoplastic polymers, engineered polymers, polymer blends, polymer alloys, polymer composites; elastomers; materials compositions and composites containing dry lubricants, comprising for example graphite, carbon, molybdenum, molybdenum disulfide, polytetrafluoroethylene, polyperfluoropropylene, polyperfluoroalkylethers, and the like.

In an embodiment, a lubricant composition of the instant disclosure gives advantaged friction, wear, and other lubricant performances when used in combination with lubricated surfaces of 3-D printed materials and equivalently materials derived from additive manufacturing techniques, with or without post-printing surface finishing; surfaces of 3-D printed materials that have been post-printing treated with coatings, which may comprise plasma spray coatings, ion beam-generated coatings, electrolytically- or galvanically-generated coatings, electro-deposition coatings, vapor-deposition coatings, liquid-deposition coatings, thermal coatings, laser-based coatings; surfaces of 3-D printed materials, where the surfaces may be as-printed, finished, or coated, comprising: metals, metal alloys, non-metals, non-metal alloys, mixed carbon-metal composites and alloys, mixed carbon-nonmetal composites and alloys, ferrous metals, ferrous composites and alloys, non-ferrous metals, non-ferrous composites and alloys, titanium, titanium composites and alloys, aluminum, aluminum composites and alloys, magnesium, magnesium composites and alloys, ion-implanted metals and alloys; plasma modified surfaces; surface modified materials; mono-layer, multi-layer, and gradient layered coatings; honed surfaces; polished surfaces; etched surfaces; textured surfaces; micro and nano structures on textured surfaces; super-finished surfaces; diamond-like carbon (DLC), DLC with high-hydrogen content, DLC with moderate hydrogen content, DLC with low-hydrogen content, DLC with zero hydrogen content, DLC composites, DLC-metal compositions and composites, DLC-nonmetal compositions and composites; glasses, metallic glasses; ceramics, cermets, ceramic oxides, ceramic nitrides, FeN, CrN, ceramic carbides, mixed ceramic compositions, and the like; polymers, thermoplastic polymers, engineered polymers, polymer blends, polymer alloys, polymer composites; materials compositions and composites containing dry lubricants, comprising for example graphite, carbon, molybdenum, molybdenum disulfide, polytetrafluoroethylene, polyperfluoropropylene, polyperfluoroalkylethers, and the like.

In an embodiment, the instant disclosure gives advantaged synergistic friction, wear, and other lubricant performances when used in combination with one or more performance additives, comprising detergents, dispersants, cleanliness agents, antiwear agents, extreme pressure agents, friction modifiers, antioxidants, anti-corrosion, anti-rust, defoamants, seals compatibilizers, viscosity modifiers, pour point modifiers, and others; with performance additives at effective concentration ranges; and with performance additives at effective ratios with the instant disclosure.

The description provides the following exemplary embodiments, which are provided by way of illustrative example only and are not to be construed as limiting.

Examples

Lubricant formulations were prepared as described herein. Briefly, lubricant fluid base stocks were admixed and at the ratios indicated, and to those mixtures the desired additive was included (See Tables 1-7). For comparison, the additives were included at two treat rates or amounts; "high" and "low," respectively, in order to observe the efficacy of the additive to reduce surface roughness, wherein Ra is the arithmetic average roughness, and Rq is the root mean squared value.

Surface roughness was measured using a standard mini-traction machine (MTM) (PCS Instruments, Inc., UK) using discs having relatively high initial roughness. In the standard MTM configuration, the test specimens are a 19.05 mm (¾") steel ball and a 46 mm diameter steel disc. The ball is loaded against the face of the disc and the ball and disc are driven independently to create a mixed rolling/sliding contact. The frictional force between the ball and disc is measured by a force transducer. Additional sensors measure the applied load, the lubricant temperature and (optionally) the electrical contact resistance between the specimens and the relative wear between them. In the examples of Tables 1-5, the frictional force is applied at 1.00 GPa pressure, at a temperature of 140° C., at a mean speed of 100 mm/s, and 250% slide-to-roll ratio (SRR). Specimens had an average initial roughness of 0.15 m. In general, a difference between initial and final Rq of at least 0.02 m or more is considered a significant reduction in roughness.

In the following examples, "base stock" comprises at least one of Group II, Group III, Group IV, Group V oils or a combination thereof.

TABLE 1

Exemplary lubricant compositions comparing high and low treat rate friction modifier and/or antiwear additives.

|  |  |  | Example 1A | Example 1B | Example 2A | Example 2B |
|---|---|---|---|---|---|---|
| Base Stock (wt %) |  |  | 99.95 | 99.64 | 99.66 | 98.3 |
| Surface Reactive Component (wt %) | Molybdenum-based Friction Modifier |  | 0.05 | 0.36 |  |  |
|  | ZDDP |  |  |  | 0.34 | 1.7 |
| Metals (ppm) | Mo |  | 28 | 190 | <0.5 | <0.5 |
|  | P |  | <5 | <5 | 286 | 1520 |
|  | Zn |  | 0.7 | 0.6 | 325 | 1710 |
| Rough discs | Pre-MTM | Initial Rq (μm) | 0.148 | 0.156 | 0.165 | 0.161 |
|  | Post-MTM | Final Rq (μm) | 0.148 | 0.059 | 0.159 | 0.081 |
|  |  | Change in Rq | 0.00 | 0.098 | 0.006 | 0.080 |

Table 1 illustrates that, the molybdenum-based friction modifier and zinc dialkyl 5 dithiophosphate at relatively low levels, respectively, do not significantly change the roughness (Examples 1A, 2A). However at higher levels, respectively, both additives provide a significant decrease in surface roughness.

TABLE 2

Exemplary lubricant compositions comparing high and low treat rate friction modifier and/or antiwear additives.

|  |  |  | Example 3A | Example 3B | Example 3C | Example 4A | Example 4B |
|---|---|---|---|---|---|---|---|
| Base Stock (wt %) |  |  | 99.75 | 97.0 | 99.9 | 99.75 | 97.0 |
| Surface Reactive Component (wt %) | GMO-type friction modifier |  | 0.25 | 3 | 0.1 |  |  |
|  | Polymeric ester-type friction modifier |  |  |  |  | 0.25 | 3 |
| Metals (ppm) | Mo |  | 1 | 1 | <0.5 | 1.1 | 1 |
|  | P |  | <5 | <5 | <5 | <5 | <5 |
|  | Zn |  | 0.9 | 0.9 | <0.5 | 0.9 | 0.9 |
| Rough discs | Pre-MTM | Initial Rq (μm) | 0.182 | 0.177 | 0.215 | 0.174 | 0.186 |
|  | Post-MTM | Final Rq (μm) | 0.107 | 0.091 | 0.087 | 0.121 | 0.109 |
|  |  | Change in Rq | 0.075 | 0.086 | 0.128 | 0.053 | 0.077 |

Table 2 illustrates that at both high and low levels, the organic friction modifiers provided a significant reduction in surface roughness. Even a very low level of organic friction modifier, Example 3C, provides a significant reduction in surface roughness.

TABLE 3

Exemplary lubricant compositions comparing high and low treat rate friction modifier and/or antiwear additives.

|  |  | Example 5A | Example 5B | Example 6A | Example 6B |
|---|---|---|---|---|---|
| Base Stock (wt %) |  | 99.95 | 99.0 | 99.95 | 99.0 |
| Surface Reactive Component (wt %) | TriPhenyl PhosphoroThionate | 0.05 | 1.00 |  |  |
|  | TriCresylPhosphate |  |  | 0.05 | 1.00 |
| Metals (ppm) | Mo | <0.5 | <0.5 | <0.5 | <0.5 |
|  | P | 34 | 934 | 38 | 908 |
|  | Zn | <0.5 | <0.5 | <0.5 | <0.5 |

TABLE 3-continued

Exemplary lubricant compositions comparing high and low treat rate friction modifier and/or antiwear additives.

| | | | Example 5A | Example 5B | Example 6A | Example 6B |
|---|---|---|---|---|---|---|
| Rough discs | Pre-MTM | Initial Rq (μm) | 0.201 | 0.166 | 0.189 | 0.183 |
| | Post-MTM | Final Rq (μm) | 0.0929 | 0.0654 | 0.0652 | 0.121 |
| | | Change in Rq | 0.108 | 0.101 | 0.124 | 0.062 |

Table 3 shows the effects of TriPhenyl PhosphoroThionate (TPPT, Example 5) and TriCresylPhosphate (TCP, Example 6). For both high and low levels of TPPT and TCP a reduction in surface roughness was observed, however, high levels of TCP appear less efficacious, while low and high levels of TPPT are at least as effective as Examples 1, 2, 3, and 4.

In another series of experiments, exemplary formulations were prepared comprising a combination of additives, and their ability to reduce roughness in the MTM system was determined. See Tables 4-5.

TABLE 4

Exemplary lubricant compositions comparing low-low treat rate friction modifier and/or antiwear additives.

| | | Example 7A | Example 7B | Example 8A | Example 8B |
|---|---|---|---|---|---|
| Base Stock (wt %) | | 99.85 | 99.85 | 99.51 | 99.51 |
| Surface Reactive Component (wt %) | Molybdenum-based Friction Modifier | 0.05 | 0.05 | 0.05 | 0.05 |
| | ZDDP | | | 0.34 | 0.34 |
| | GMO-type friction modifier | 0.1 | | 0.1 | |
| | Polymeric ester-type friction modifier | | 0.1 | | 0.1 |
| Metals (ppm) | Mo | 25 | 25 | 26 | 26 |
| | P | <5 | <5 | 291 | 308 |
| | Zn | <0.5 | <0.5 | 322 | 327 |
| Rough discs | Pre-MTM Initial Rq (μm) | 0.160 | 0.151 | 0.132 | 0.156 |
| | Post-MTM Final Rq (μm) | 0.085 | 0.130 | 0.073 | 0.0941 |
| | Change in Rq | 0.0752 | 0.021 | 0.059 | 0.0619 |

In Table 4, Examples 7 and 8 show that low levels of additives can be used in combination to reduce surface roughness.

TABLE 5

Exemplary lubricant compositions comparing high-high and low-low treat rate friction modifier and/or antiwear additives.

| | | Example 9A | Example 9B | Example 10A | Example 10B |
|---|---|---|---|---|---|
| Base Stock (wt %) | | 97.64 | 97.64 | 95.94 | 95.94 |
| Surface Reactive Component (wt %) | Molybdenum-based Friction Modifier | 0.36 | 0.36 | 0.36 | 0.36 |
| | ZDDP | | | 1.7 | 1.7 |
| | GMO-type friction modifier | 2 | | 2 | |
| | Polymeric ester-type friction modifier | | 2 | | 2 |

TABLE 5-continued

Exemplary lubricant compositions comparing high-high and low-low treat rate friction modifier and/or antiwear additives.

|  |  |  | Example 9A | Example 9B | Example 10A | Example 10B |
|---|---|---|---|---|---|---|
| Metals (ppm) |  | Mo | 190 | 170 | 190 | 190 |
|  |  | P | <5 | <5 | 1520 | 1520 |
|  |  | Zn | <0.5 | <0.5 | 1710 | 1710 |
| Rough discs | Pre-MTM | Initial Rq (μm) | 0.128 | 0.150 | 0.129 | 0.185 |
|  | Post-MTM | Final Rq (μm) | 0.061 | 0.078 | 0.115 | 0.185 |
|  |  | Change in Rq | 0.0673 | 0.0716 | 0.014 | 0 |

In Table 5, Examples 9A and 9B show that with high levels of organic friction modifiers, the lubricant compositions were active at reducing the surface roughness. However, Examples 10A and 10B, with high levels of multiple friction-modifiers and antiwear additives, did not show significant efficacy. Without being bound by any particular theory, it is possible that high concentrations of these additives are not effective in combination, and therefore, abrogate or eliminate the advantageous surface roughness reducing activity.

In another series of experiments, exemplary formulations were prepared comprising a combination of additives, and their ability to reduce roughness on 3D printed surfaces in the MTM system was determined, See Table 6-8. The 3D-printed MTM discs were made from 17-4SSPH Stainless Steel using DMLS (Direct Metal Laser Sintering) SD40 (standard definition 40 micron layer thickness). They were finished with media blasting to remove excess DMLS unsintered powders from the net shape geometry.

The 3D-printed surfaces had a higher and more variable initial roughness than the 0.15 μm rough specimens. Therefore the MTM test was run with a gradual increase in from 2N to 36N (1 GPa) over 1 hr, then continuing with the test protocol outlined above.

TABLE 6

Exemplary lubricant compositions comparing treat rate ranges of surface reactive friction modifier components

|  |  |  | No Additives | Example 1A | Example 1A | Example 1B | Example 3C |
|---|---|---|---|---|---|---|---|
| Base Stock (wt %) |  |  | 100 | 99.95 | 99.95 | 99.64 | 99.9 |
| Surface Reactive Component (% wt) |  | Molybdenum-based Friction Modifer |  | 0.05 | 0.05 | 0.36 |  |
|  |  | ZDDP |  |  |  |  |  |
|  |  | GMO-type friction modifier |  |  |  |  | 0.1 |
|  |  | TCP |  |  |  |  |  |
| Metals (ppm) |  | Mo | — | 28 | 28 | 190 | <0.5 |
|  |  | P | — | <5 | <5 | <5 | <5 |
|  |  | Zn | — | 0.7 | 0.7 | 0.6 | <0.5 |
| 3D-printed discs | Pre-MTM | Initial Rq (μm) | 1.3 | 2.02 | 2.98 | 1.65 | 1.58 |
|  | Post-MTM | Final Rq (μm) | 0.14 | 0.18 | 0.08 | 0.19 | 0.15 |
|  |  | Change in Rq | 1.16 | 1.84 | 2.9 | 1.46 | 1.43 |

In Table 6, Examples 1A, 1B and 3C show that friction modifiers, both organic and inorganic, at a wide range of concentration, are effective at reducing surface roughness of 3D printed surfaces. In particular when compared to the Reference No Additive Example, Examples 1A, 1B, and 3C show improved ability to reduce surface roughness.

TABLE 7

Exemplary lubricant compositions comparing treat rate ranges of surface reactive phosphorus components.

|  |  | No Additives | Example 2A | Example 2B | Example 6A |
|---|---|---|---|---|---|
| Base Stock (wt %) |  | 100 | 99.66 | 98.3 | 99.9 |
| Surface Reactive | Molybdenum- |  |  |  |  |

TABLE 7-continued

Exemplary lubricant compositions comparing treat rate ranges of surface reactive phosphorus components.

| | | No Additives | Example 2A | Example 2B | Example 6A |
|---|---|---|---|---|---|
| Component (% wt) | based Friction Modifer | | | | |
| | ZDDP | | 0.34 | 1.7 | |
| | GMO-type friction modifier | | | | |
| | TCP | | | | 0.05 |
| Metals (ppm) | Mo | — | <0.5 | <0.5 | <0.5 |
| | P | — | 286 | 1520 | 38 |
| | Zn | — | 325 | 1710 | <0.5 |
| 3D-printed discs Pre-MTM | Initial Rq (μm) | 1.3 | 2.4 | 1.51 | 1.55 |
| Post-MTM | Final Rq (μm) | 0.14 | 0.16 | 0.12 | 0.11 |
| | Change in Rq | 1.16 | 2.24 | 1.39 | 1.44 |

In Table 7, Examples 2A, 2B and 6A show that phosphorus-containing components, both organic and inorganic, at a wide range of concentration, are effective at reducing surface roughness of 3D printed surfaces. In particular when compared to the Reference No Additive Example, Examples 2A, 2B, and 6A show improved ability to reduce surface roughness. In addition, lower concentrations of inorganic phosphorus containing components seen in Example 2A show improved ability to reduce surface roughness as compared to higher concentrations seen in Example 2B.

TABLE 8

Exemplary lubricant compositions comparing treat rate ranges of surface reactive component combinations

| | | No Additives | Example 8B | Example 11 |
|---|---|---|---|---|
| Base Stock (wt %) | | 100 | 99.51 | 89* |
| Surface Reactive Component (% wt) | Molybdenum-based Friction Modifier | | 0.05 | 0.15 |
| | ZDDP | | 0.34 | 0.86 |
| | GMO-type friction modifier | | 0.1 | 0.5 |
| | TCP | | | |
| Metals (ppm) | Mo | — | 26 | 80 |
| | P | — | 308 | 777 |
| | Zn | — | 327 | 866 |
| 3D-printed discs Pre-MTM | Initial Rq (μm) | 1.3 | 3.27 | 1.66 |
| Post-MTM | Final Rq (μm) | 0.14 | 0.12 | 0.08 |
| | Change in Rq | 1.16 | 3.15 | 1.58 |

*Example 11 also contains ~10% of other typical engine oil performance additives.

In Table 8, Examples 8B and 11 show that combinations of surface active additives also provide a benefit in reducing surface roughness of 3D printed surface as compared to the Reference No Additives Example. When multiple surface active components (friction modifier, phosphorus-containing components etc.) are combined in a composition as seen in Example 8B, there is a significant improvement in reducing surface roughness as compared to single components as seen 10 in Examples 1A, 2A and 3C. In addition, when other typical lubricant additives are combined with surface active components as seen in Example 11, effective reduction in surface roughness in 3D printed surfaces is still achieved.

Therefore, it has been unexpectedly discovered that lubricant compositions comprising certain additives, e.g., friction modifiers and/or antiwear additives, can significantly reduce the surface roughness of materials that have not been surfaced finished according to standard methods. Thus, the present description provides compositions and methods to using unfinished materials in mechanical systems that have low friction demands, e.g., engine parts. As such, the present compositions and methods offer the additional advantage of reducing potential costs of manufacturing and allowing for the use of 3D printed materials that have higher surface roughness.

The foregoing description, drawings and illustrative embodiments clearly illustrate the advantages encompassed by the process of the present disclosure and the benefits to be afforded with the use thereof.

The description provides a composition comprising an additive manufactured (AM) component, article or material and a lubricant composition as described herein. In any of the aspects or embodiments described herein, the description provides a machine, device or system comprising an AM component, article or material, and the lubricant composition as described herein. In any of the embodiments described herein, the description provides a machine, device or system comprising an additive manufactured, e.g., 3D printed, component, article or material and an effective amount of a lubricant composition as described herein, wherein the lubricant composition improves friction wear or other lubricant performance in the machine, device or system. In any of the embodiments described, the machine, device or system comprises a plurality of components, articles or materials that are additive manufactured.

In any of the aspects or embodiments described herein, the AM material is a 3D printed material.

The description also provides methods of improving friction, wear, and other lubricant performances, including surface roughness, of an AM component, article or material or machine, device or system including an additive manufactured article, component or material comprising the steps of: providing a lubricant composition comprising a lubricant fluid in combination with at least one surface reactive component; providing an AM article or material having a first surface roughness; applying the lubricant composition to the AM material; and applying a load to the AM article or material, wherein the lubricant composition reduces the surface roughness of the AM article or material resulting in a second surface roughness that is less than the first surface roughness. In any of the aspects or embodiments described herein, the article or material has an initial roughness of at least 0.1 µm. In any of the aspects or embodiments described herein, the surface reactive component comprises at least one member selected from the group consisting of a friction modifier, friction reducer, anti-corrosion additive, antiwear additive, viscosity modifier, extreme pressure additive, dispersant, detergent, antioxidant, anticorrosive additive, and combinations thereof. In any of the aspects or embodiments described herein, the surface reactive component comprises at least one of an antiwear additive, a friction modifier or a combination thereof. In any of the aspects or embodiments, the friction modifier is a metal-containing friction modifier. In any of the aspects or embodiments, the friction modifier is an organic friction modifier.

In any of the aspects or embodiments, the antiwear additive comprises a member selected from the group consisting of a metal-containing dialkyl dithiophosphate, metal-containing antiwear additive, metal-free antiwear additive, metal stearate, ashless phosphate, dithiocarbamate, sulfur-containing antiwear additives, sulfur-phosphorus-containing additives, carboxylates, carboxylate salts, and a combination thereof. In any of the aspects or embodiments, the antiwear additive is ZDDP. In any of the aspects or embodiments, the antiwear additive is TCP. In any of the aspects or embodiments, the antiwear additive is TPPT.

In any of the aspects or embodiments, the metal-containing friction modifier comprises at least one effective metal or metalloid selected from the group consisting of Al, Ba, Bi, Ca, Cd, Co, Cr, Cu, Fe, K, Li, Mg, Mo, Na, Ni, P, Si, Sn, Ti, W, Zn, Zr, Y, rare earth metals, and combinations thereof. In any of the aspects or embodiments, the effective metal comprises at least one of Mo, P, Zn, or a combination thereof.

In any of the aspects or embodiments, the organic friction modifier comprises at least one member selected from the group consisting of glycerol monooleates, alkoxylated alcohols, stearyl ethers, fatty acid-based esters, fatty acid-based amides, carboxylates, salicylates, polymeric esters, oxygen-containing friction modifiers, polyalkylene glycols, and combinations thereof.

In any of the aspects or embodiments, the lubricant fluid comprises at least one of a mineral, synthetic, or natural fluid of lubricating viscosity.

In any of the aspects or embodiments, the lubricant fluid comprises a member selected from the group consisting of hydrogenated polyalphaolefin (PAO), Group V base stock, Group II base stock, Group III base stock, and a combination thereof.

In any of the aspects or embodiments, the material comprises at least one of a metal, an alloy, cermet, ceramic, or a combination thereof.

In any of the aspects or embodiments, the alloy comprises a member selected from the group consisting of authentic stainless steels, duplex steels, tool steels (& maraging steels), low alloy steels, cobalt alloys, nickel alloys, copper alloys, bismuth alloys, titanium alloys, rare earth element type alloys, MCrAlY alloys, aluminum alloys, tin alloys, bronze alloys, and combinations thereof.

In any aspects or embodiments described herein, the load (i.e., force) is from about 0.5 MPa to about 2 GPa pressure. In any of the aspects or embodiments, the load is a frictional force. In any of the aspects or embodiments, the force is due to sliding of a surface of the article or material relative to another surface or a frictional force.

In any of the aspects or embodiments, the load is applied under lubrication conditions wherein the temperature is from about 20° C. to about 200° C. In any of the aspects or embodiments, the load is applied under lubrication conditions of a mean sliding speed from 5 mm/s to about 5000 mm/s. In any of the aspects or embodiments, the load is applied under lubrication conditions wherein the sliding is from about 5% slide-to-roll ratio to about 100% sliding.

In any of the aspects or embodiments, the load is applied under conditions of from about 0.01 GPa to about 2 GPa pressure, from about 50° C. to about 200° C., a mean speed of from about 50 mm/s to about 500 mm/s, and from about 5% to about 250% slide-to-roll ratio (SRR).

In any of the aspects or embodiments, the initial or first surface roughness is reduced by at least 1%, 2%, 3%, 4%, 5%, 6%, 7%, 8%, 9%, 10% or more.

In any of the aspects or embodiments, the initial or first surface roughness is reduced by at least 10%, 20%, 30%, 40%, 50%, 60%, 70%, 80%, 90% or more.

In any of the aspects or embodiments, the resulting or second surface roughness, Rq, is ≤8 µm, ≤5 µm, ≤2 µm, ≤1 µm, ≤0.5 µm, ≤0.2 µm, ≤0.1 µm, ≤0.05 µm, ≤0.03 µm, ≤0.02 µm, or ≤0.01 µm.

In any of the aspects or embodiments described herein, the AM article or material is a component of a machine, device or system including an internal combustion engine, a power train, a driveline, a transmission, a gear, a gear train, a gear set, a compressor, a pump, a hydraulic system, a bearing, a bearing race, a bushing, a turbine, a mechanical device, an electro-mechanical device, an electrical device, a hydraulic device, a hybrid device, a steering rack, a transmission, a fuel injector, camshaft lobe, hydraulic cylinder rod, a disc, a piston, piston ring, a cylinder liner, a cylinder, a cylinder rod, a cam, a tappet, a lifter, a bearing, a journal, a roller, a needle roller, a sharpening stone, a tapered, a needle, a ball, a valve or a combination thereof.

In certain additional aspects, the description provides lubricant compositions comprising from about 50 wt % to about 98 wt % of lubricant fluid in combination with an effective amount of an additive including from about 0.01 wt % to about 5 wt % of a friction modifier, and from about 0.01 wt % to about 5 wt % of an antiwear agent, wherein the additive is effective for reducing surface roughness of an AM component, article or material. In any of the aspects or embodiments, the lubricant composition includes at least one surface reactive component selected from the group consisting of a friction reducer, anti-corrosion additive, viscosity modifier, extreme pressure additive, dispersant, detergent, antioxidant, anticorrosive additive, and combinations thereof. In any of the aspects of embodiments, the surface reactive component comprises an effective metal. In any of the aspects or embodiments, the lubricant composition includes at least one of from about 0.01 ppm to about 2000 ppm of Mo, from about 0.01 ppm to about 2000 ppm of P, from about 0.01 ppm to about 2000 ppm of Zn, or a combination thereof.

In certain embodiments, the description provides a method of reducing the surface roughness of an additive manufactured (AM) engine component, article or material comprising: providing an engine including an AM component, article or material having a first surface roughness; applying a lubricant composition to the engine including the AM component, article or material, wherein the lubricant composition comprises a lubricant fluid in combination with at least one surface active component; and operating the engine thereby applying a load, e.g., a frictional force or a sliding force, to the additive manufactured component, wherein the lubricant composition reduces the surface roughness of the AM component, article or material resulting in a second surface roughness that is less than the first surface roughness.

In certain embodiments, the description provides a method of screening surface finishing lubricant compositions comprising the steps of: providing a lubricant composition comprising a lubricant fluid in combination with at least one surface reactive component, providing an AM component, article or material having a first surface roughness; applying the lubricant composition to the AM component, article or material; and applying a load, e.g., a frictional force or a sliding force, to the AM component, article or material, wherein the lubricant composition reduces the surface roughness of the AM component, article or material resulting in a second surface roughness that is less than the first surface roughness. In certain embodiments, the frictional force is applied under conditions of 0.5-2 GPa pressure, 50-200° C., a mean speed of 50-500 mm/s, and 150%-250% slide-to-roll ratio (SRR).

In certain embodiments, the description provides a method of reducing the surface roughness of a 3D printed component, article or material comprising: providing a lubricant composition comprising a lubricant fluid in combination with at least one surface reactive component, providing a 3D printed component, article or material having a first surface roughness; applying the lubricant composition to the 3D printed component, article or material; wherein the lubricant composition reduces the surface roughness of the 3D printed component, article or material resulting in a second surface roughness that is less than the first surface roughness. In any of the aspects or embodiments described herein, after applying the lubricant composition, the method includes a step of applying a load or force, e.g., frictional or sliding force, to the 3D printed component, article or material, wherein the lubricant composition reduces the surface roughness of the 3D printed component, article or material resulting in a second surface roughness that is less than the first surface roughness.

PCT/EP Clauses:

1. Use of a lubricant composition in a method of reducing the surface roughness of an additive manufactured (AM) article or material comprising the steps of: providing a lubricant composition comprising a lubricant fluid in combination with at least one surface reactive component, providing an AM article or material having a first surface roughness; applying the lubricant composition to the AM material; and applying a load to the AM article or material, wherein the lubricant composition reduces the surface roughness of the AM article or material resulting in a second surface roughness that is less than the first surface roughness.

2. The use of clause 1, wherein the additive manufactured article or material is a 3D printed article or material.

3. The use according to any of clauses 1-2, where the article or material has an initial roughness of at least 0.1 µm.

4. The use according to any one of clauses 1-3, wherein the surface reactive component comprises at least one member selected from the group consisting of a friction modifier, friction reducer, anti-corrosion additive, antiwear additive, viscosity modifier, extreme pressure additive, dispersant, detergent, antioxidant, anticorrosive additive, and combinations thereof.

5. The use according to any one of clauses 1-4, wherein the surface reactive component comprises at least one of an antiwear additive, a friction modifier or a combination thereof.

6. The use according to any one of clauses 3-5, wherein the friction modifier is a metal-containing friction modifier.

7. The use according to any one of clauses 3-6, wherein the friction modifier is an organic friction modifier.

8. The use according to any one of clauses 3-7, wherein the antiwear additive comprises a member selected from the group consisting of a metal-containing dialkyl dithiophosphate, metal-containing antiwear additive, metal-free antiwear additive, metal stearate, ashless phosphate, dithiocarbamate, sulfur-containing antiwear additives, sulfur-phosphorus-containing additives, carboxylates, carboxylate salts, and a combination thereof.

9. The use according to any one of clauses 3-8, wherein the antiwear additive is ZDDP.

10. The use according to any one of clauses 3-8, wherein the antiwear additive is TCP.

11. The use according to any one of clauses 3-8, wherein the antiwear additive is TPPT.

12. The use according to clause 6, wherein the metal-containing friction modifier comprises at least one effective metal or metalloid selected from the group consisting of Al, Ba, Bi, Ca, Cd, Co, Cr, Cu, Fe, K, Li, Mg, Mo, Na, Ni, P, Si, Sn, Ti, W, Zn, Zr, Y, rare earth metals, and combinations thereof.

13. The use according to clause 7, wherein the organic friction modifier comprises at least one member selected from the group consisting of glycerol monooleates, alkoxylated alcohols, stearyl ethers, fatty acid-based esters, fatty acid-based amides, carboxylates, salicylates, polymeric esters, oxygen-containing friction modifiers, polyalkylene glycols, and combinations thereof.

14. The use according to clause 1, wherein the lubricant fluid comprises a member selected from the group consisting of hydrogenated polyalphaolefin (PAO), Group V base stock, Group II base stock, Group III base stock, and a combination thereof.

15. The use according to any one of clauses 1-14, wherein the AM article or material is a component of a machine, device or system including an internal combustion engine, a power train, a driveline, a transmission, a gear, a gear train, a gear set, a compressor, a pump, a hydraulic system, a bearing, a bearing race, a bushing, a turbine, a mechanical device, an electro-mechanical device, an electrical device, a hydraulic device, a hybrid device, a steering rack, a transmission, a fuel injector, camshaft lobe, hydraulic cylinder rod, a disc, a piston, piston ring, a cylinder liner, a cylinder, a cylinder rod, a cam, a tappet, a lifter, a bearing, a journal, a roller, a needle roller, a sharpening stone, a tapered, a needle, a ball, a valve or a combination thereof.

While preferred embodiments of the invention have been shown and described herein, it will be understood that such embodiments are provided by way of example only and are not meant to be limiting examples. Numerous variations, changes and substitutions will occur to those skilled in the art without departing from the spirit of the invention. Accordingly, it is intended that the appended claims cover all such variations as fall within the spirit and scope of the invention. All such alternative embodiments may be covered by the scope of the invention to the extent where the stability of the resulting composition is not substantially affected.

Various modifications or changes in light thereof will be suggested to persons skilled in the art and are included within the spirit and purview of this application and are considered within the scope of the appended claims. For example, the relative quantities of the ingredients may be varied to optimize the desired effects, additional ingredients may be added, and/or similar ingredients may be substituted for one or more of the ingredients described. Additional advantageous features and functionalities associated with the systems, methods, and processes of the present invention will be apparent from the appended claims. Moreover, those skilled in the art will recognize, or be able to ascertain using no more than routine experimentation, many equivalents to the specific embodiments of the invention described herein. Such equivalents are intended to be encompassed by the following claims.

The invention claimed is:

1. A method of reducing the surface roughness of an additive manufactured (AM) article or material comprising:
   a. providing a lubricant composition comprising a lubricant fluid in combination with at least one surface reactive component,
   b. providing a preformed AM article or material having a first surface roughness;
   c. applying the lubricant composition to the preformed AM material after the AM process; and
   d. applying a load to the lubricated preformed AM article or material during its intended operation, wherein the lubricant composition reduces the surface roughness of the lubricated preformed AM article or material resulting in a second surface roughness that is less than the first surface roughness.

2. The method of claim 1, where the article or material has an initial roughness of at least 0.1 μm.

3. The method of claim 1, wherein the surface reactive component comprises at least one member selected from the group consisting of a friction modifier, friction reducer, anti-corrosion additive, antiwear additive, viscosity modifier, extreme pressure additive, dispersant, detergent, antioxidant, anticorrosive additive, and combinations thereof.

4. The method of claim 3, wherein the surface reactive component comprises at least one of an antiwear additive, a friction modifier or a combination thereof.

5. The method of claim 4, wherein the friction modifier is a metal-containing friction modifier.

6. The method of claim 4, wherein the friction modifier is an organic friction modifier.

7. The method of claim 3, wherein the antiwear additive comprises a member selected from the group consisting of a metal-containing dialkyl dithiophosphate, metal-containing antiwear additive, metal-free antiwear additive, metal stearate, ashless phosphate, dithiocarbamate, sulfur-containing antiwear additives, sulfur-phosphorus-containing additives, carboxylates, carboxylate salts, and a combination thereof.

8. The method of claim 7, wherein the antiwear additive is ZDDP.

9. The method of claim 7, wherein the antiwear additive is TCP.

10. The method of claim 7, wherein the antiwear additive is TPPT.

11. The method of claim 5, wherein the metal-containing friction modifier comprises at least one effective metal or metalloid selected from the group consisting of Al, Ba, Bi, Ca, Cd, Co, Cr, Cu, Fe, K, Li, Mg, Mo, Na, Ni, P, Si, Sn, Ti, W, Zn, Zr, Y, rare earth metals, and combinations thereof.

12. The method of claim 11, wherein the effective metal comprises at least one of Mo, P, Zn, or a combination thereof.

13. The method of claim 6, wherein the organic friction modifier comprises at least one member selected from the group consisting of glycerol monooleates, alkoxylated alcohols, stearyl ethers, fatty acid-based esters, fatty acid-based amides, carboxylates, salicylates, polymeric esters, oxygen-containing friction modifiers, polyalkylene glycols, and combinations thereof.

14. The method of claim 1, wherein the lubricant fluid comprises at least one of a mineral, synthetic, or natural fluid of lubricating viscosity.

15. The method of claim 14, wherein the lubricant fluid comprises a member selected from the group consisting of hydrogenated polyalphaolefin (PAO), Group V base stock, Group II base stock, Group III base stock, and a combination thereof.

16. The method of claim 1, wherein the article material comprises at least one of a metal, an alloy, cermet, ceramic, a non-metal, a polymer, a resin, a coating, or a combination thereof.

17. The method of claim 16, wherein the alloy comprises a member selected from the group consisting of austenitic stainless steels, duplex steels, tool steels (& maraging steels), low alloy steels, cobalt alloys, nickel alloys, copper alloys, bismuth alloys, titanium alloys, rare earth element type alloys, MCrAlY alloys, aluminum alloys, tin alloys, bronze alloys, and combinations thereof.

18. The method of claim 1, wherein the load is from 0.5 MPa to 2 GPa pressure.

19. The method of claim 1, wherein the load is a frictional force.

20. The method of claim 19, wherein the frictional force is due to sliding of a surface of the article or material relative to another surface.

21. The method of claim 1, wherein the load is applied under lubrication conditions wherein the temperature is from 20° C. to 200° C.

22. The method of claim 19, wherein the load is applied under lubrication conditions of a mean sliding speed is from 5 mm/s to 5000 mm/s.

23. The method of claim 19, wherein the load is applied under lubrication conditions wherein the sliding is from 5% slide-to-roll ratio to 100% sliding.

24. The method of claim 1, wherein the load is applied under conditions of from 0.01 GPa to 2 GPa pressure, from 50° C. to 200° C., a mean speed of from 50 mm/s to 500 mm/s, and from 5% to 250% slide-to-roll ratio (SRR).

25. The method of claim 1, wherein the first surface roughness is reduced by at least 1%.

26. The method of claim 1, wherein the first surface roughness is reduced by at least 10%.

27. The method of claim 1, wherein the second surface roughness, Rq, is ≤8 μm.

28. The method of claim 1, wherein the additive manufactured article or material is a 3D printed article or material.

29. The method of claim 1, wherein the AM article or material is a component of a machine, device or system including an internal combustion engine, a power train, a driveline, a transmission, a gear, a gear train, a gear set, a compressor, a pump, a hydraulic system, a bearing, a bearing race, a bushing, a turbine, a mechanical device, an electro-mechanical device, an electrical device, a hydraulic device, a hybrid device, a steering rack, a transmission, a fuel injector, camshaft lobe, hydraulic cylinder rod, a disc, a piston, piston ring, a cylinder liner, a cylinder, a cylinder rod, a cam, a tappet, a lifter, a bearing, a journal, a roller, a needle roller, a sharpening stone, a tapered, a needle, a ball, a valve or a combination thereof.

30. The method of claim 29, wherein the engine includes a combustion engine.

31. A method of reducing the surface roughness of an additive manufactured (AM) engine component comprising:

a. providing an engine including a preformed AM component having a first surface roughness;
b. applying a lubricant composition to the engine including the preformed AM component, wherein the lubricant composition comprises a lubricant fluid in combination with at least one surface active component; and
c. operating the engine thereby applying a frictional force to the lubricated preformed additive manufactured component during its intended operation,
    wherein the lubricant composition reduces the surface roughness of the AM component resulting in a second surface roughness that is less than the first surface roughness.

32. A method of screening surface finishing lubricant compositions comprising the steps of:
a. providing a lubricant composition comprising a lubricant fluid in combination with at least one surface reactive component,
b. providing a preformed AM article or material having a first surface roughness;
c. applying the lubricant composition to the preformed AM article or material after the AM process; and
d. applying a load to the lubricated preformed AM article or material during its intended operation,
    wherein the lubricant composition reduces the surface roughness of the AM article or material resulting in a second surface roughness that is less than the first surface roughness.

33. A method of reducing the surface roughness of a 3D printed article or material comprising:
a. providing a lubricant composition comprising a lubricant fluid in combination with at least one surface reactive component,
b. providing a preformed 3D printed article or material having a first surface roughness;
c. applying the lubricant composition to the preformed 3D printed material after the 3D printing process; and
d. applying a load to the lubricated preformed 3D printed article or material during its intended operation,
wherein the lubricant composition reduces the surface roughness of the 3D printed article or material resulting in a second surface roughness that is less than the first surface roughness.

* * * * *